(12) United States Patent
Nishi et al.

(10) Patent No.: US 10,455,545 B2
(45) Date of Patent: Oct. 22, 2019

(54) INFORMATION COMMUNICATION TERMINAL, PERIPHERAL DEVICE COOPERATION METHOD, AND PROGRAM

(71) Applicant: NTT DOCOMO, INC., Chiyoda-ku (JP)

(72) Inventors: Ryuji Nishi, Chiyoda-ku (JP); Sadaatsu Kato, Chiyoda-ku (JP); Yoshinori Matsushima, Chiyoda-ku (JP); Koichi Asano, Chiyoda-ku (JP); Hironori Ishikawa, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 58 days.

(21) Appl. No.: 15/520,299

(22) PCT Filed: Nov. 5, 2015

(86) PCT No.: PCT/JP2015/081221
§ 371 (c)(1),
(2) Date: Apr. 19, 2017

(87) PCT Pub. No.: WO2016/084577
PCT Pub. Date: Jun. 2, 2016

(65) Prior Publication Data
US 2017/0339666 A1 Nov. 23, 2017

(30) Foreign Application Priority Data
Nov. 26, 2014 (JP) .................................. 2014-239340

(51) Int. Cl.
*H04W 4/00* (2018.01)
*H04W 68/02* (2009.01)
(Continued)

(52) U.S. Cl.
CPC ....... *H04W 68/02* (2013.01); *H04M 1/72527* (2013.01); *H04W 4/50* (2018.02)

(58) Field of Classification Search
CPC .............................. H04W 68/00; H04W 68/12
See application file for complete search history.

(56) References Cited

U.S. PATENT DOCUMENTS

2009/0181726 A1* 7/2009 Vargas .............. H04M 1/72533
455/567
2015/0341903 A1* 11/2015 Jeong .................... H04W 68/02
455/458

OTHER PUBLICATIONS

Extended European Search Report dated Nov. 16, 2017 in Patent Application No. 15862890.9.
(Continued)

*Primary Examiner* — Omoniyi Obayanju
(74) *Attorney, Agent, or Firm* — Oblon, McClelland, Maier & Neustadt, L.L.P.

(57) ABSTRACT

An information communication terminal includes; a reception unit configured to receive setting values of notification setting for plural connected peripheral devices; a peripheral device setting storage unit configured to store the received setting values of notification setting for the plural peripheral devices; a service application setting storage unit configured to store setting values of notification setting from a service application to the plural connected peripheral devices by using the setting values stored in the peripheral device setting storage unit as initial values; a control unit configured to assign a setting value of notification setting to transmission data on the basis of a setting value stored in the service application setting storage unit when the transmission data are received from the service application; and a transmission unit configured to transmit the transmission data to which the setting value of notification setting is assigned to at least one peripheral device.

17 Claims, 29 Drawing Sheets

(51) Int. Cl.
*H04W 4/50* (2018.01)
*H04M 1/725* (2006.01)

(56) References Cited

OTHER PUBLICATIONS

International Search Report dated Jan. 12, 2016 in PCT/JP2015/081221 (with English translation).
Office Action dated May 22, 2019 in European Application No. 15862890.9 (6 pages).

* cited by examiner

FIG.5

| PERIPHERAL DEVICE NAME | INCLUDED HW | SETTING FOR PERIPHERAL DEVICE ||||||||
| --- | --- | --- | --- | --- | --- | --- | --- | --- | --- |
| | | NOTIFICATION SOUND || VIBRATION || LED (COLOR) || LED (BLINKING PATTERN) ||
| | | WHETHER SETTING IS ENABLED: RANGE OF SETTING VALUE | SETTING VALUE | WHETHER SETTING IS ENABLED: RANGE OF SETTING VALUE | SETTING VALUE | WHETHER SETTING IS ENABLED: RANGE OF SETTING VALUE | SETTING VALUE | WHETHER SETTING IS ENABLED: RANGE OF SETTING VALUE | SETTING VALUE |
| PERIPHERAL DEVICE 1 | - DISPLAY<br>- VIBRATION<br>- SPEAKER<br>- LED | ENABLED: 1~5 | 1 | ENABLED: 1~5 | 1 | ENABLED: 1~3 | 1 | ENABLED: 1~3 | 1 |
| PERIPHERAL DEVICE 2 | - VIBRATION<br>- LED<br>- MICROPHONE | NOT ENABLED | — | ENABLED: 1~2 | 2 | ENABLED: 1 | OFF | ENABLED: 1~3 | 3 |
| PERIPHERAL DEVICE 3 | - LED<br>- CAMERA | NOT ENABLED | — | NOT ENABLED: | — | ENABLED: 1~2 | 2 | ENABLED: 1 | 1 |

FIG.6

| PERIPHERAL DEVICE NAME | SETTING FOR SERVICE APPLICATION |||||||||
|---|---|---|---|---|---|---|---|---|---|
| | SERVICE APPLICATION A ||||| SERVICE APPLICATION B ||||
| | RINGING SETTING ||||| RINGING SETTING ||||
| | NOTIFICA-TION ON/OFF | NOTIFICA-TION SOUND | VIBRATION | LED (COLOR) | LED (BLINKING PATTERN) | NOTIFICA-TION ON/OFF | NOTIFICA-TION SOUND | VIBRATION | LED (COLOR) | LED (BLINKING PATTERN) |
| PERIPHERAL DEVICE 1 | ON | 3 | 2 | 1 | 2 | ON | COMMON SETTING | 1 | COMMON SETTING | COMMON SETTING |
| PERIPHERAL DEVICE 2 | ON | – | 1 | OFF | OFF | OFF | – | 1 | 1 | 2 |
| PERIPHERAL DEVICE 3 | OFF | – | – | COMMON SETTING | 1 | ON | – | – | 1 | 1 |

FIG.8A

| IDENTIFIER OF SERVICE APPLICATION | IDENTIFIER OF DESTINATION PERIPHERAL DEVICE | NO RINGING SETTING | CONTENT OF TRANSMISSION DATA |

FIG.8B

| DATA TRANSMITTED TO PERIPHERAL DEVICE 1 | IDENTIFIER OF SERVICE APPLICATION | RINGING SETTING FOR PERIPHERAL DEVICE 1 | CONTENT OF TRANSMISSION DATA |
|---|---|---|---|
| DATA TRANSMITTED TO PERIPHERAL DEVICE 2 | IDENTIFIER OF SERVICE APPLICATION | RINGING SETTING FOR PERIPHERAL DEVICE 2 | CONTENT OF TRANSMISSION DATA |

| IDENTIFIER OF SERVICE APPLICATION | IDENTIFIER OF DESTINATION PERIPHERAL DEVICE | PRESENCE OF RINGING SETTING | RINGING SETTING | CONTENT OF TRANSMISSION DATA |
| --- | --- | --- | --- | --- |

FIG.10B

| | IDENTIFIER OF SERVICE APPLICATION | RINGING SETTING | CONTENT OF TRANSMISSION DATA |
|---|---|---|---|
| DATA TRANSMITTED TO PERIPHERAL DEVICE 1 | | | |
| DATA TRANSMITTED TO PERIPHERAL DEVICE 2 | IDENTIFIER OF SERVICE APPLICATION | RINGING SETTING | CONTENT OF TRANSMISSION DATA |
| ... | | | |

FIG.13

| INCLUDED HW | HW CONDITION SETTING | | |
|---|---|---|---|
| | MAIL | SCHEDULE | INCOMING CALL |
| | TRANSMISSION DATA<br>• TITLE<br>• BODY<br>• NOTIFICATION ICON<br>• SOURCE SERVICE APPLICATION NAME<br>• NOTIFICATION ID | TRANSMISSION DATA<br>• TITLE<br>• START TIME<br>• END TIME<br>• LOCATION<br>• PERSON<br>• SOURCE SERVICE APPLICATION NAME<br>• NOTIFICATION ID | TRANSMISSION DATA<br>• PHONE NUMBER OF ORIGINATING CALL<br>• NAME OF CALLER<br>• NOTIFICATION ID |
| DISPLAY | SELECTED TRANSMISSION DATA<br>• ALL | SELECTED TRANSMISSION DATA<br>• ALL | SELECTED TRANSMISSION DATA<br>• ALL |
| VIBRATION | SELECTED TRANSMISSION DATA<br>• ONLY NOTIFICATION ID | SELECTED TRANSMISSION DATA<br>• ONLY NOTIFICATION ID | SELECTED TRANSMISSION DATA<br>• ONLY NOTIFICATION ID |
| SPEAKER | SELECTED TRANSMISSION DATA<br>• TITLE<br>• SOURCE SERVICE APPLICATION NAME<br>• NOTIFICATION ID | SELECTED TRANSMISSION DATA<br>• TITLE<br>• START TIME<br>• LOCATION<br>• SOURCE SERVICE APPLICATION NAME<br>• NOTIFICATION ID | SELECTED TRANSMISSION DATA<br>• NAME OF CALLER<br>• NOTIFICATION ID |

FIG.14A

| IDENTIFIER OF SERVICE APPLICATION | IDENTIFIER OF DESTINATION PERIPHERAL DEVICE | NO RINGING SETTING | TITLE OF MAIL | BODY OF MAIL | NOTIFI-CATION ICON | SOURCE SERVICE APPLICATION NAME | NOTIFI-CATION ID |

(TITLE OF MAIL, BODY OF MAIL, NOTIFICATION ICON, SOURCE SERVICE APPLICATION NAME, NOTIFICATION ID = CONTENT OF TRANSMISSION DATA)

FIG.19A

| INFORMATION ABOUT DESTINATION PERIPHERAL DEVICE | RINGING SETTING ENABLED | CONTENT OF TRANSMISSION DATA |

FIG.19B

| DATA TRANSMITTED TO PERIPHERAL DEVICE 2 | RINGING SETTING FOR PERIPHERAL DEVICE 2 | CONTENT OF TRANSMISSION DATA |
|---|---|---|
| DATA TRANSMITTED TO PERIPHERAL DEVICE 3 | RINGING SETTING FOR PERIPHERAL DEVICE 3 | CONTENT OF TRANSMISSION DATA |

...

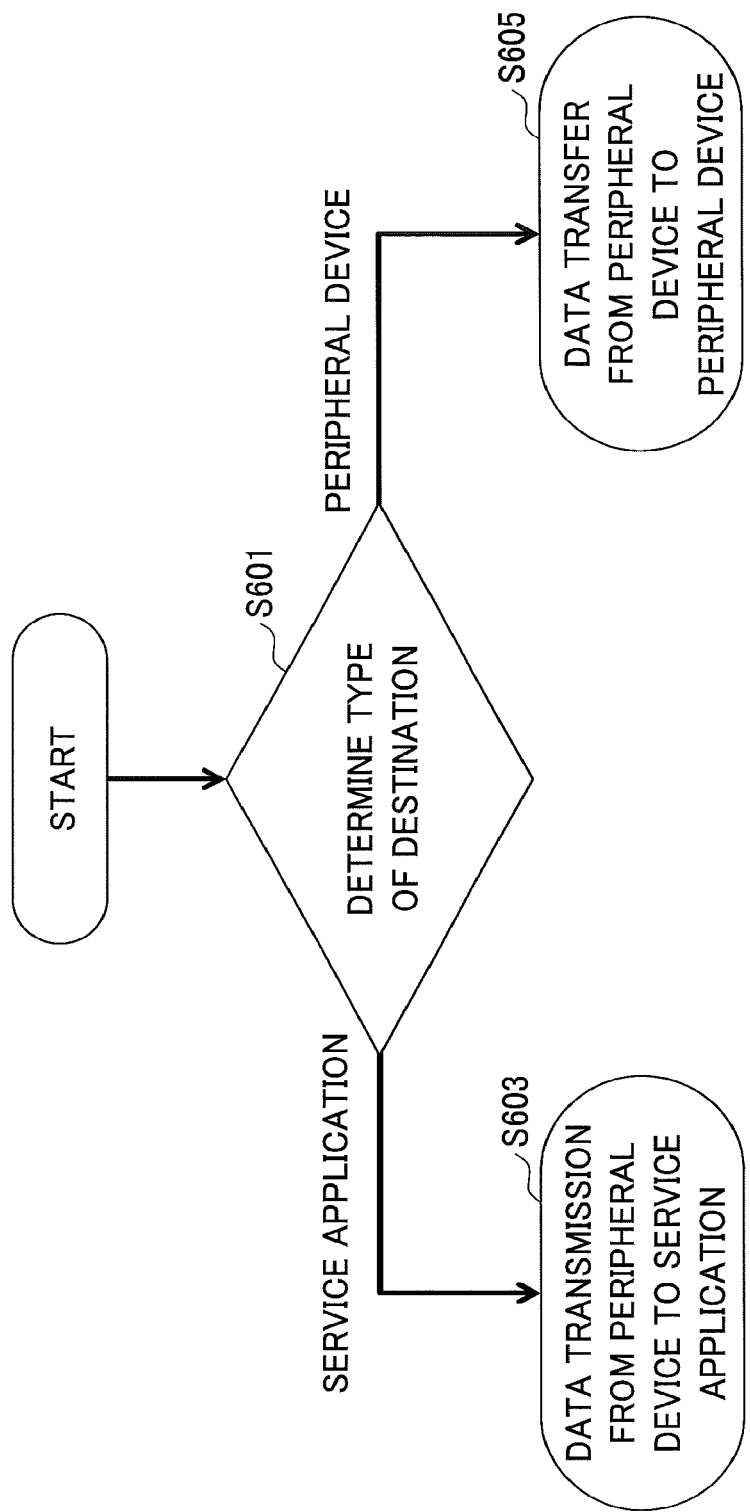

FIG.21A

| IDENTIFICATION INFORMATION OF DESTINATION | IDENTIFIER (ID) OF DESTINATION SERVICE APPLICATION | CONTENT OF TRANSMISSION DATA |

FIG.21B

| IDENTIFICATION INFORMATION OF DESTINATION | INFORMATION ABOUT DESTINATION PERIPHERAL DEVICE | PRESENCE OF RINGING SETTING | CONTENT OF TRANSMISSION DATA |
|---|---|---|---|

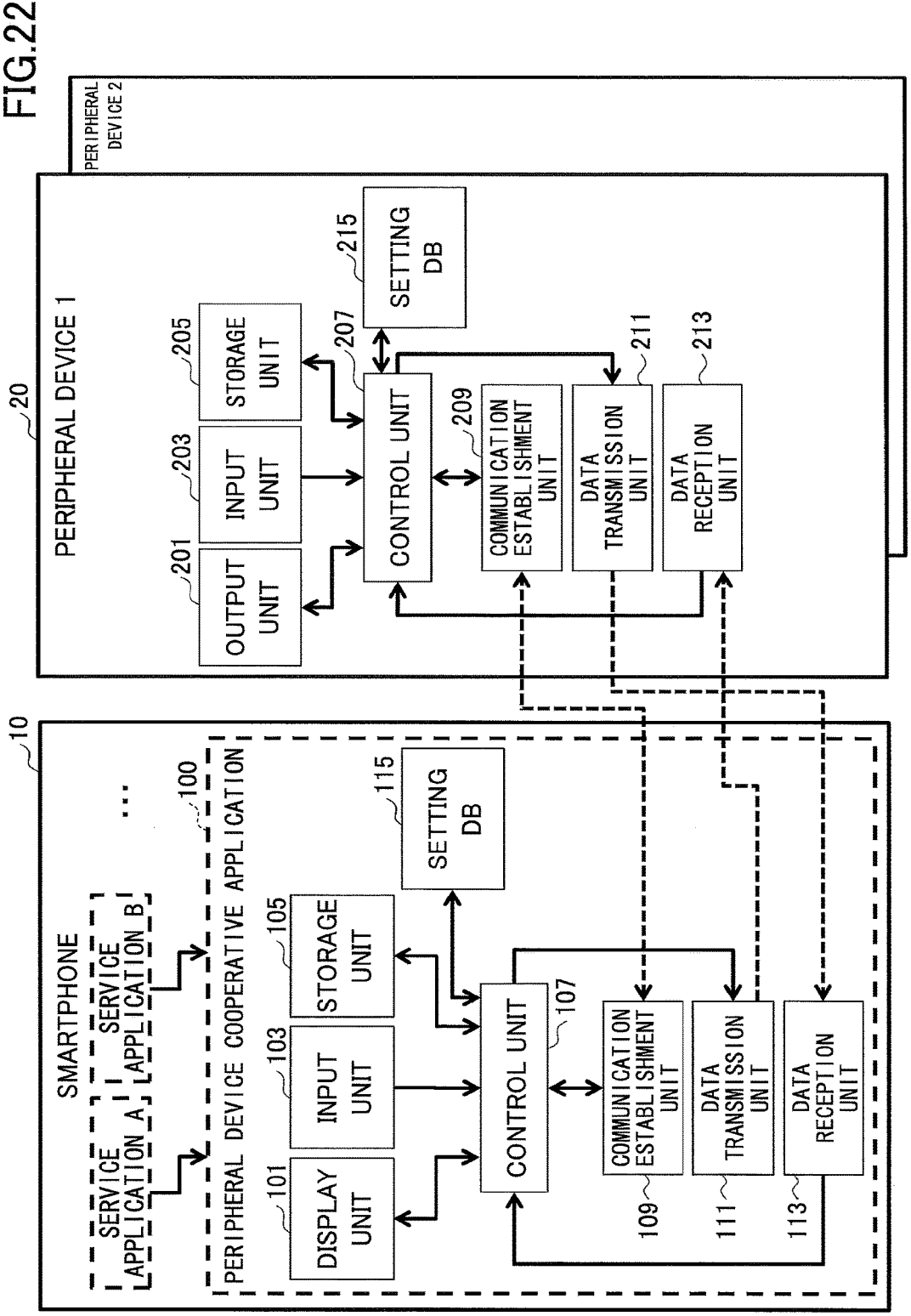

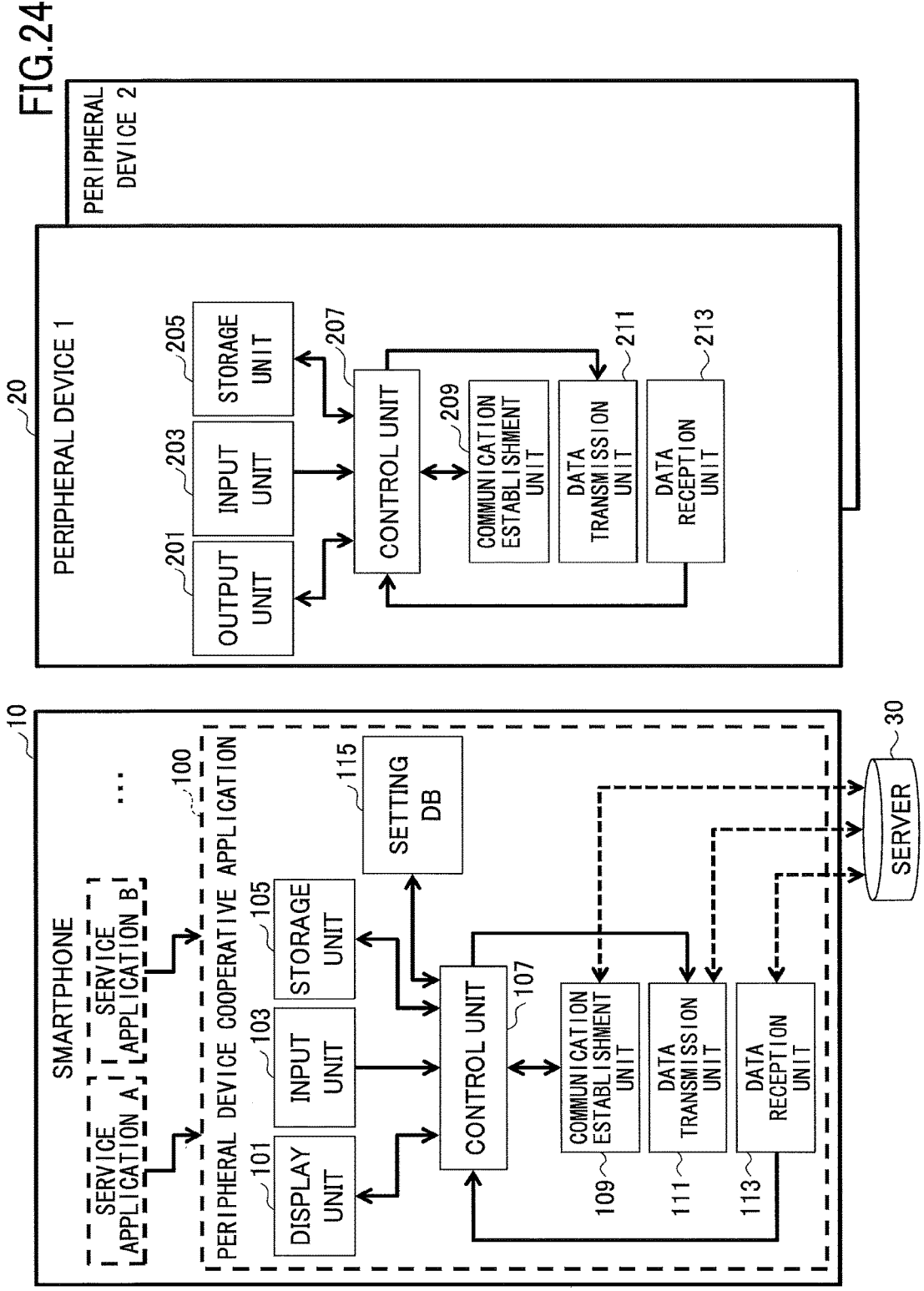

INFORMATION COMMUNICATION TERMINAL, PERIPHERAL DEVICE COOPERATION METHOD, AND PROGRAM

TECHNICAL FIELD

The present invention relates to an information communication terminal, a peripheral device cooperation method, and a program.

BACKGROUND ART

As information communication terminals such as smartphones have grown in performance, cooperation with peripheral devices has become possible. For example, it is possible to confirm a mail arriving at a smartphone by using a wearable device, or it is possible to notify the wearable device that a schedule registered on the smartphone approaches.

In order to enable such cooperation, an application on a smartphone (hereinafter, referred to as a service application) is connected by using a different connection scheme for each peripheral device. Namely, the service application is generated for each peripheral device.

FIG. 1 illustrates a peripheral device cooperation scheme in the related art. In order to perform data transmission and reception between a smartphone and a peripheral device 1, a service application A for the peripheral device 1 is installed on the smartphone. In addition, in order to perform data transmission and reception between the smartphone and a peripheral device 2, a service application B for the peripheral device 2 is installed on the smartphone. In this manner, cooperation between the smartphone and the peripheral devices 1 and 2 is realized.

SUMMARY OF THE INVENTION

Problem to be Solved by the Invention

As described with reference to FIG. 1, in order to realize cooperation with the peripheral devices, the service applications and the peripheral devices need to cooperate with each other in a one-to-one relationship. Since the service application A for the peripheral device 1 is a service application for data transmission and reception between the service application A and peripheral device 1, it is impossible to perform data transmission and reception with respect to the peripheral device 2. Similarly, since the service application B for the peripheral device 2 is a service application for data transmission and reception between the service application B and peripheral device 2, it is impossible to perform data transmission and reception with respect to the peripheral device 1. Even for service application having a similar feature, it is necessary to separately prepare service application for each peripheral device.

In addition, notification setting from each service application to the peripheral device is also managed by using a setting database (setting DB 1 and setting DB 2) for each service application.

In this manner, since the cooperation scheme is different for each peripheral device, usability for the user is reduced. For example, in the case of making notification setting such as ringing setting for a notification from a service application to a peripheral device, it is necessary to make the setting by activating a different service application for each peripheral device.

Furthermore, since the cooperation scheme is different for each peripheral device, a service application developer is required to develop a service application for each peripheral device.

As described above, when the cooperation scheme is different for each peripheral device, a plurality of service applications cannot cooperate with a plurality of peripheral devices, and convenience to both the user and the service application developer decreases.

The present invention aims to provide a scheme in which a plurality of service applications in an information communication terminal such as a smartphone can cooperate with a plurality of peripheral devices and to collectively manage notification setting from the service applications to the peripheral devices.

Means for Solving Problem

According to an aspect of the present invention, there is provided an information communication terminal including: a reception unit configured to receive setting values of notification setting for a plurality of connected peripheral devices; a peripheral device setting storage unit configured to store the received setting values of notification setting for the plurality of peripheral devices; a service application setting storage unit configured to store setting values of notification setting from a service application to the plurality of connected peripheral devices by using the setting values stored in the peripheral device setting storage unit as initial values; a control unit configured to assign a setting value of notification setting to transmission data on the basis of a setting value stored in the service application setting storage unit when the transmission data are from the service application; and a transmission unit configured to transmit the transmission data to which the setting value of notification setting is assigned to at least one peripheral device.

In addition, according to another aspect of the present invention, there is provided a peripheral device cooperation method in an information communication terminal, including steps of: receiving setting values of notification setting for a plurality of connected peripheral devices; storing the received setting values of notification setting for the plurality of peripheral device in a peripheral device setting storage unit; storing, in a service application setting storage unit, setting values of notification setting from a service application to the plurality of connected peripheral devices by using the setting values stored in the peripheral device setting storage unit as initial values; assigning a setting value of notification setting to transmission data on the basis of a setting value stored in the service application setting storage unit when the transmission data are received from the service application; and transmitting the transmission data to which the setting value of notification setting is assigned to at least one peripheral device.

In addition, according to another aspect of the present invention, there is provided a program causing a computer as an information communication terminal for cooperating with peripheral devices to function as: a reception means for receiving setting values of notification setting for a plurality of connected peripheral devices; a peripheral device setting storage means for storing the received setting values of notification setting for the plurality of peripheral devices; a service application setting storage means for storing setting values of notification setting from a service application to the plurality of connected peripheral devices by using the setting values stored in the peripheral device setting storage unit as initial values; a control means for assigning a setting value of notification setting to transmission data on the basis of a setting value stored in the service application setting storage unit when the transmission data are received from the service application; and a transmission means for transmitting the transmission data to which the setting value of notification setting is assigned to at least one peripheral device.

Effect of the Invention

According to the present invention, it is possible to provide a scheme in which a plurality of service applications in an information communication terminal such as a smartphone can cooperate with a plurality of peripheral devices and to collectively manage notification setting from the service applications to peripheral devices.

BRIEF DESCRIPTION OF DRAWINGS

FIG. 5 is a diagram illustrating an example of information stored in a peripheral device setting storage unit;

FIG. 6 is a diagram illustrating an example of information stored in a service application setting storage unit;

FIG. 8A is a diagram illustrating an example of data that a peripheral device cooperative application receives from a service application;

FIG. 8B is a diagram illustrating an example of data that a peripheral device cooperative application transmits to a peripheral device;

FIG. 10A is a diagram illustrating an example of data that a peripheral device cooperative application receives from a service application;

FIG. 10B is a diagram illustrating an example of data that a peripheral device cooperative application transmits to a peripheral device;

FIG. 13 is a diagram illustrating an example of information stored in an HW condition setting storage unit;

FIG. 14A is a diagram illustrating an example of data that a peripheral device cooperative application receives from a service application;

FIG. 19A is a diagram illustrating an example of data that a peripheral device cooperative application receives from a peripheral device;

FIG. 19B is a diagram illustrating an example of data that a peripheral device cooperative application transmits to a peripheral device;

FIG. 20 is a flowchart that combines the flowchart of FIG. 15 and the flowchart of FIG. 18;

FIG. 21A is a diagram illustrating an example of data that a peripheral device cooperative application receives from a peripheral device (in the case where a destination is a service application);

FIG. 21B is a diagram illustrating an example of data that a peripheral device cooperative application receives from a peripheral device (in the case where a destination is a peripheral device);

FIG. 22 is a functional block diagram of a smartphone and a peripheral device according to a Modified Example 4 of the present invention;

FIG. 24 is a functional block diagram of a smartphone, a peripheral device, and a server according to a Modified Example 5 of the present invention.

MODE(S) FOR CARRYING OUT THE INVENTION

Hereinafter, embodiments of the present invention will be described with reference to the accompanying drawings.

In an embodiment of the present invention, a smartphone will be described as an example of an information communication terminal capable of cooperating with peripheral devices. However, the embodiments of the present invention can be applied to another information communication terminal such as a mobile phone, a tablet, a computer, and the like that can cooperate with peripheral devices.

Overview of Embodiment of Invention

Figure 1:
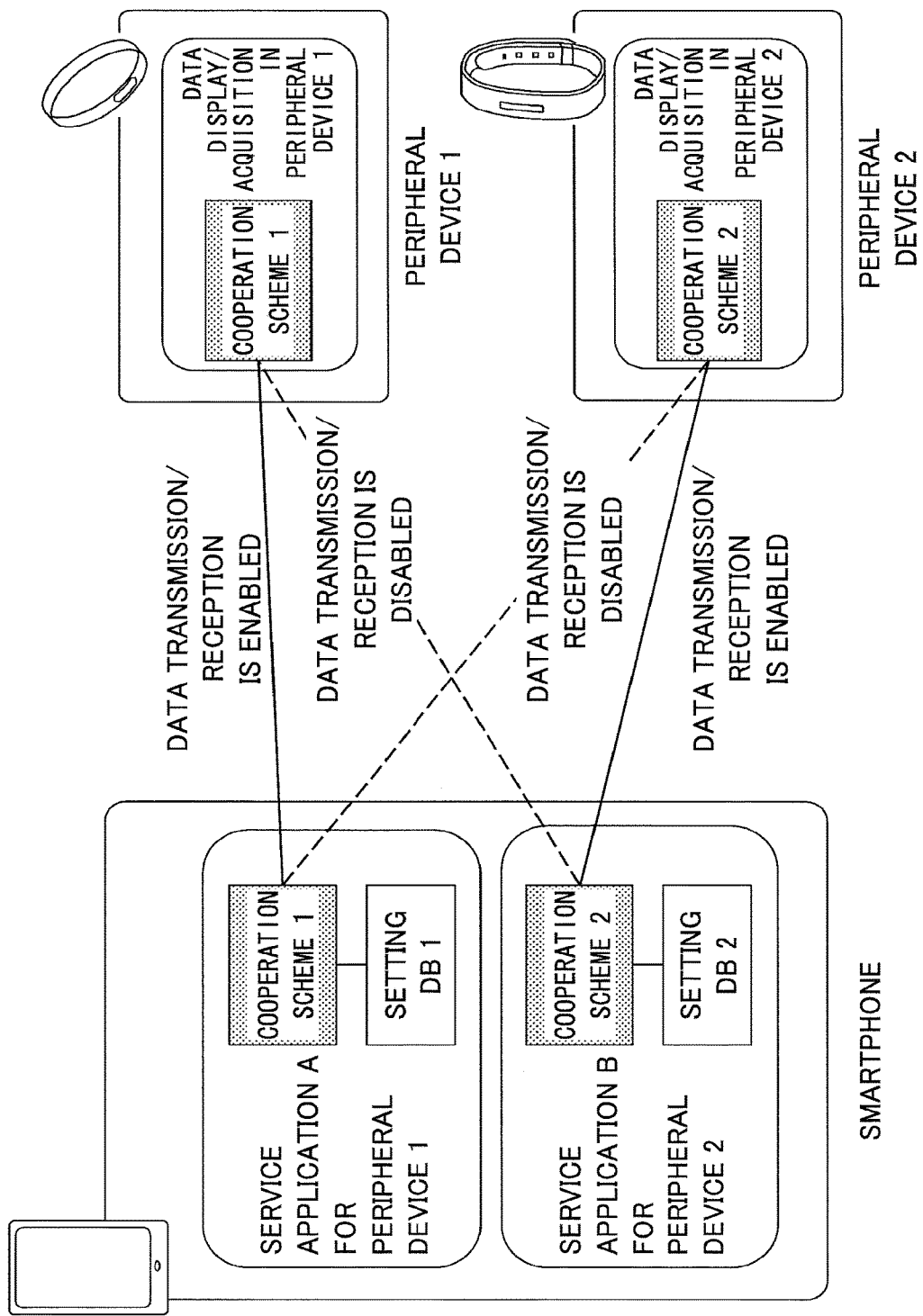
FIG. 1 is a schematic diagram illustrating a peripheral device cooperation scheme in the related art.
Figure 2:
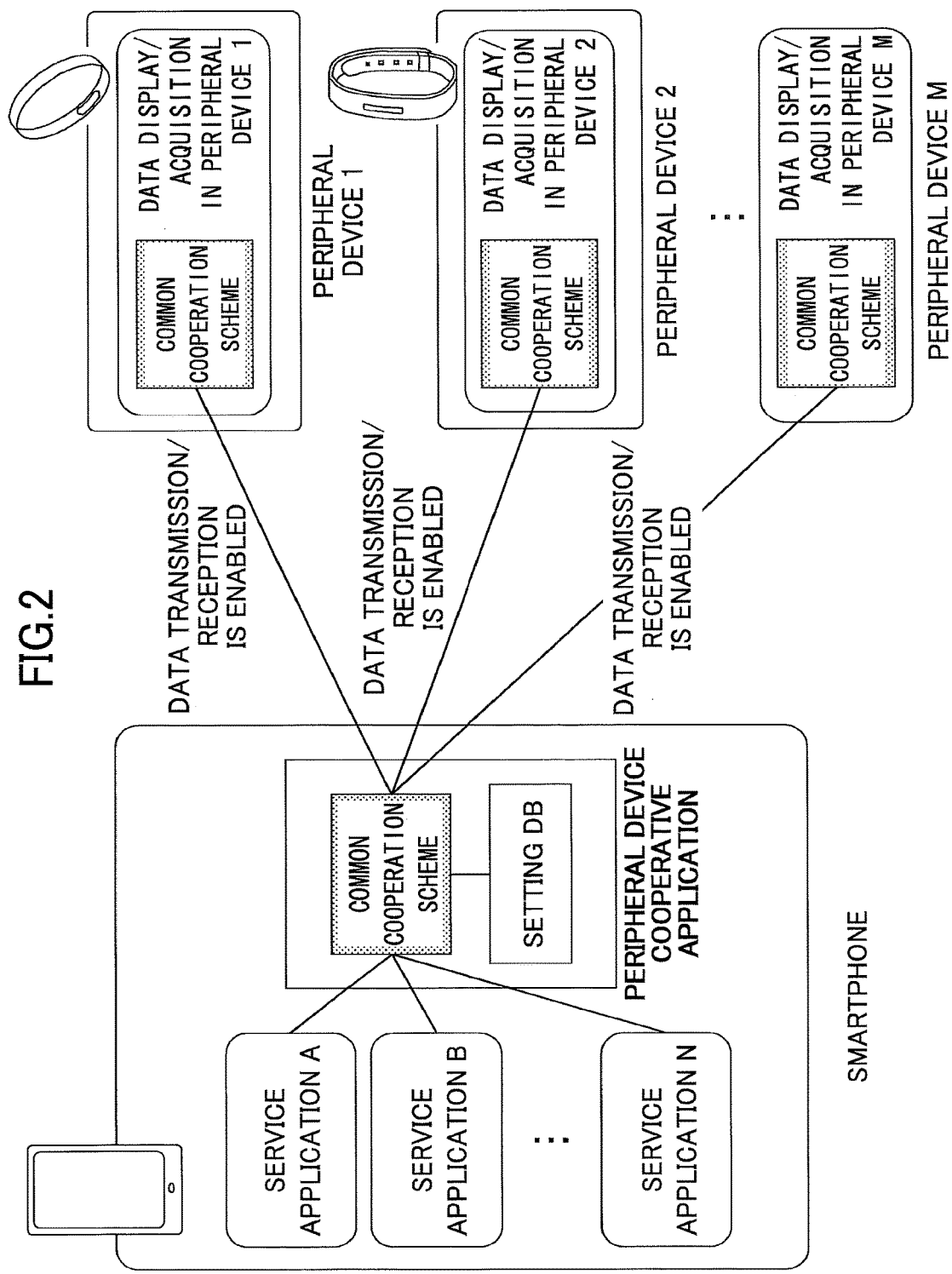
FIG. 2 is a schematic diagram illustrating a peripheral device cooperation scheme in an embodiment of the present invention.

FIG. 2 illustrates a peripheral device cooperation scheme in the embodiment of the present invention. In an embodiment of the present invention, setting values of a plurality of peripheral devices are collectively managed by using an application (hereinafter, referred to as a peripheral device cooperative application) for allowing service applications in a smartphone and the peripheral devices to cooperate with each other. The service applications perform data transmission and reception with respect to the peripheral devices through the peripheral device cooperative application. In this manner, according to the embodiment of the present invention, a common cooperation scheme is realized in which the service applications and the peripheral devices cooperate with each other in an N:M relationship (N and M are respectively one or more) through the peripheral device cooperative application.

More specifically, in order to collectively manage the setting values of the peripheral devices, the peripheral device cooperative application receives the setting values of the peripheral devices from the respective peripheral devices and stores the setting values in a setting DB (database). In addition, the setting DB also stores setting values which are used when the service applications use the peripheral devices. The setting values which are used when the service applications use the peripheral devices may be changed by a user or the like from the setting values as initial values received from the peripheral devices. For example, notification ON/OFF, ringing setting, and the like for the peripheral devices are stored in the setting DB. When transmission data are from the service application to the peripheral device, the peripheral device cooperative application provides a notification to the peripheral device on the basis of the setting value stored in the setting DB.

Figure 3:
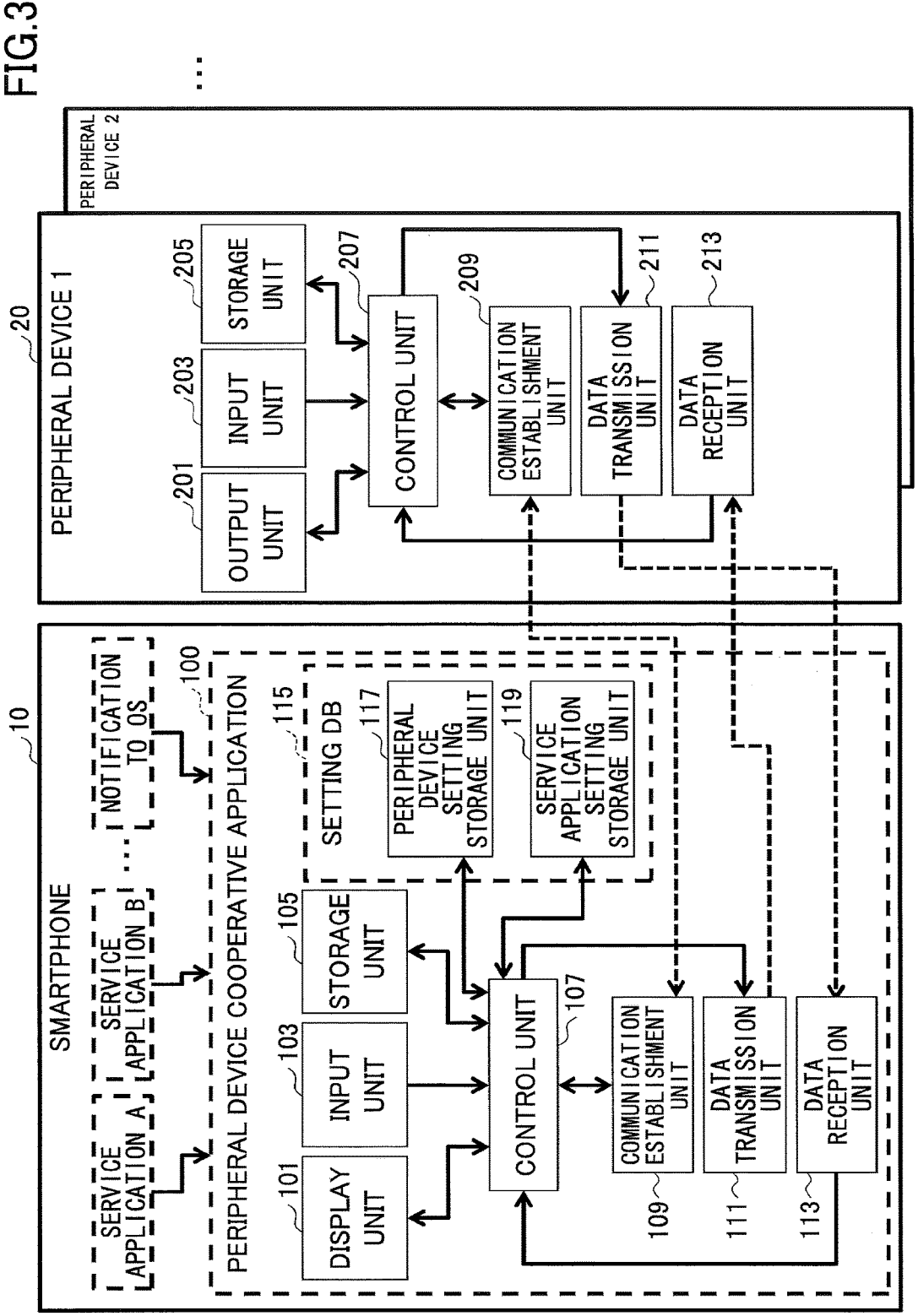
FIG. 3 is a functional block diagram of a smartphone and a peripheral device according to an embodiment of the present invention.

FIG. 3 is a functional block diagram of a smartphone 10 and a peripheral device 20 according to the embodiment of the present invention.

The smartphone 10 is an information communication terminal capable of cooperating with the peripheral device 20. The smartphone 10 may be an information communication terminal including a processor such as a CPU (Central Processing Unit), a memory device such as a RAM (Random Access Memory) and a ROM (Read Only Memory), a storage device such as a hard disk, and the like. For example, each function and processing of the smartphone 10 described below is realized by the CPU processing data and executing programs stored in the storage device or the memory device.

The smartphone 10 includes a peripheral device cooperative application 100 for cooperating with the peripheral device 20. The peripheral device cooperative application 100 includes a display unit 101, an input unit 103, a storage unit 105, a control unit 107, a communication establishment unit 109, a data transmission unit 111, a data reception unit 113, and a setting DB (database) 115.

The display unit 101 displays information on a screen of the smartphone 10. For example, the display unit 101 displays, on the screen, the setting value or the like of the peripheral device managed by the peripheral device cooperative application 100.

The input unit 103 receives information which is input to the smartphone 10. For example, the input unit 103 receives an input for changing the setting value or the like of the peripheral device managed by the peripheral device cooperative application 100.

The storage unit 105 is a storage device that stores information received by the peripheral device cooperative application 100, information generated by the peripheral device cooperative application 100, or the like.

The control unit 107 controls operations associated with cooperation with the peripheral device 20 in the peripheral device cooperative application 100. For example, when transmission data to be provided from the service application to the peripheral device 20 are received, the control unit 107 assigns an appropriate setting value to the transmission data.

The communication establishment unit 109 establishes communication with the peripheral device 20. For example, when it is detected that the peripheral device 20 is within a predetermined range from the smartphone 10, the communication establishment unit 109 establishes communication with the peripheral device 20 by using a communication protocol such as Bluetooth (registered trademark), a wireless LAN, or the like.

The data transmission unit 111 transmits data to the peripheral device 20. For example, the data transmission unit 111 transmits, to the peripheral device 20, transmission data for the peripheral device 20 received from the service application or the like.

The data reception unit 113 receives data from the peripheral device 20. For example, the data reception unit 113 receives a setting value of the peripheral device 20 and data from the peripheral device 20 to the service application or the like.

The setting DB 115 stores the setting value of the connected peripheral device 20. In the embodiment of the present invention, the setting DB 115 stores a setting value associated with notification setting for the peripheral device 20. The notification setting is setting for determining the operation of the peripheral device 20 when the peripheral device 20 receives data. The notification setting includes, for example, setting of a notification sound (ringing tone), setting of vibration, setting of blinking of an LED, setting of information display on the screen, and the like. Hereinafter, notification setting is also referred to as ringing setting. The setting DB 115 includes a peripheral device setting storage unit 117 and a service application setting storage unit 119.

The peripheral device setting storage unit 117 stores the setting value of notification setting for the peripheral device 20 received from the peripheral device 20 by the data reception unit 113.

The service application setting storage unit 119 stores a setting value of notification setting which is used when the service application uses the peripheral device 20. The setting value in the peripheral device setting storage unit 117 is used as an initial value of the setting value in the service application setting storage unit 119 (hereinafter, referred to as common setting). The common setting denotes that the setting value in the service application setting storage unit 119 is the same as the setting value in the peripheral device setting storage unit 117. Namely, when the common setting is set in the service application setting storage unit 119, the setting value of the peripheral device setting storage unit 117 is used. The common setting may be changed to a different setting value depending on the service application by an input from the input unit 103.

In addition, the peripheral device 20 includes an output unit 201, an input unit 203, a storage unit 205, a control unit 207, a communication establishment unit 209, a data transmission unit 211, and a data reception unit 213. These functional units are originally included in the peripheral device 20. However, there may also a peripheral device which does not include the output unit 201, the input unit 203, and the like.

The output unit 201 outputs information or a notification to the peripheral device 20. For example, the output unit 201 allows data transmitted from the service application through the peripheral device cooperative application 100 to be displayed on the screen. In addition, when a notification is received from the service application or the like, the output unit 201 performs ringing such as ringing of a notification sound, ringing of vibration, blinking of an LED, and information display on the screen.

The input unit 203 receives information input to the peripheral device 20. For example, the input unit 203 receives an input for changing the setting value or the like of the peripheral device 20.

The storage unit 205 is a storage device that stores information received by the peripheral device 20, information generated by the peripheral device 20, and the like. In addition, the storage unit 205 stores the setting value of the peripheral device 20.

The control unit 207 controls operations associated with cooperation with the smartphone 10. For example, when transmission data are received from the service application and notification setting is assigned to the transmission data, the control unit 207 controls ringing in the output unit 201 according to the notification setting.

The communication establishment unit 209 establishes communication with the smartphone 10.

The data transmission unit 211 transmits data to the smartphone 10. For example, the data transmission unit 211 transmits the setting value of the peripheral device 20, data from the peripheral device 20 to the service application, and the like.

The data reception unit 213 receives data from the smartphone 10. For example, the data reception unit 213 receives transmission data from the service application or the like.

<Preprocessing: Generation of Setting DB>

First, as preprocessing of a notification from the service application to the peripheral device, operations associated with generation of the setting DB 115 will be described.

Figure 4:
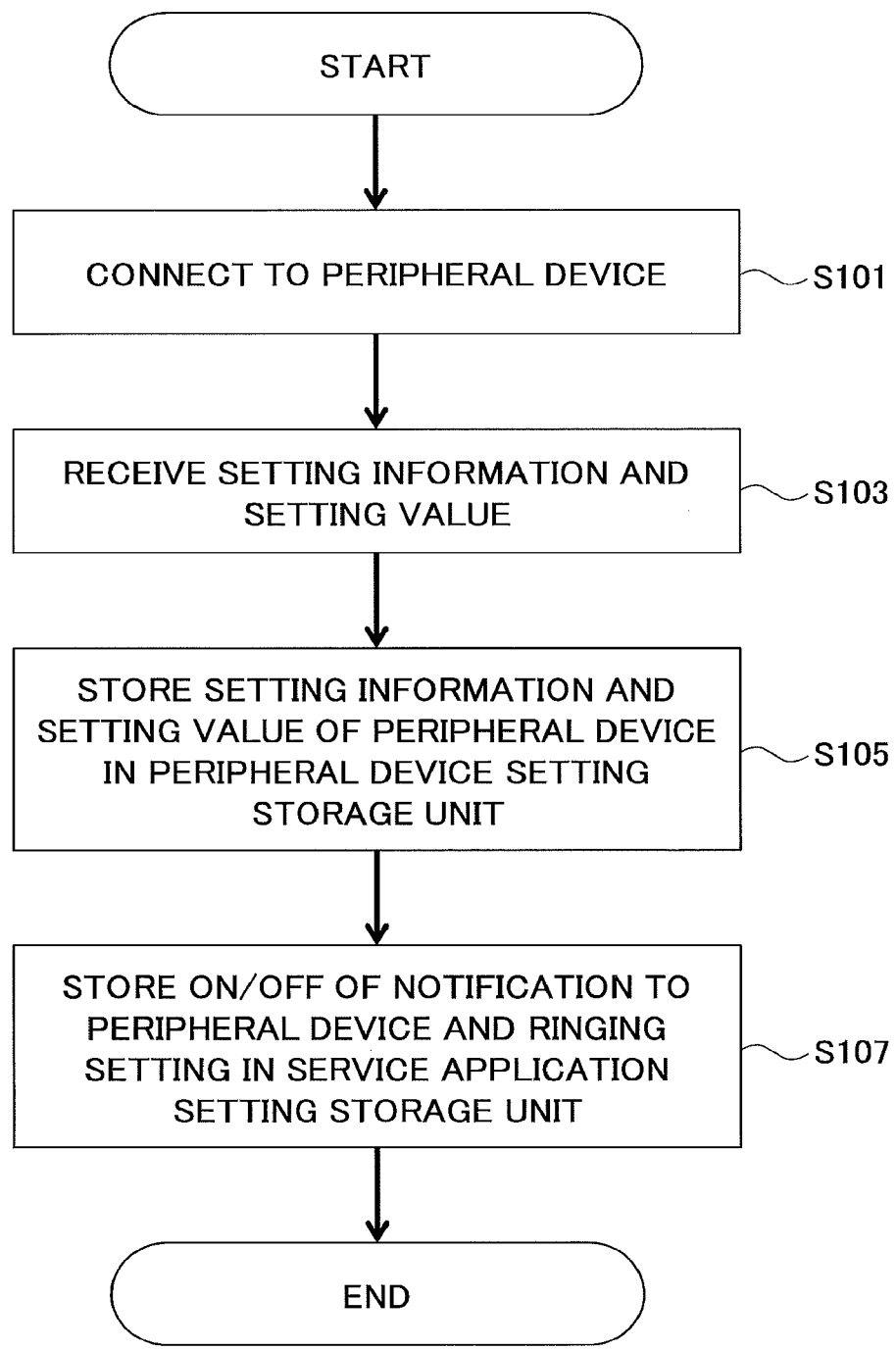
FIG. 4 is a flowchart illustrating a setting DB generation procedure in a peripheral device cooperative application according to an embodiment of the present invention.

FIG. 4 is a flowchart illustrating a procedure of generating the setting DB 115 in the peripheral device cooperative application 100 according to the embodiment of the present invention.

First, the communication establishment unit 109 in the peripheral device cooperative application 100 connects to the communication establishment unit 209 in the peripheral device 20 (S101). For connection to the peripheral device 20, a communication protocol such as Bluetooth (registered trademark), wireless LAN, or the like is used.

The peripheral device 20 transmits the setting information and the setting value stored in the storage unit 205 to the peripheral device cooperative application 100, and the data reception unit 113 in the peripheral device cooperative application 100 receives the setting information and the setting value (S103). When the data reception unit 113 has already received the setting information and the setting value after the connection to the peripheral device 20 is established, the data reception unit 113 may not receive the setting information and the setting value. However, even if the data reception unit 113 has already received the setting information and the setting value after the connection to the peripheral device 20 is established, the data reception unit 113 may periodically receive the setting information and the setting value. The setting information includes hardware (HW) included in the peripheral device, the type of available ringing, the range of the setting value, and the like. For example, when the type of the peripheral device is fixed and the setting information is determined in advance, the data reception unit 113 in the peripheral device cooperative application 100 may receive only the setting value.

When the setting information and the setting value of the peripheral device 20 are received in the data reception unit 113, the control unit 107 in the peripheral device cooperative application 100 adds an entry for the peripheral device 20 to the peripheral device setting storage unit 117 and stores the received setting information and the received setting value (S105). When the setting information and the setting value have been stored after the connection to the peripheral device 20 is established, the control unit 107 updates the setting information and the setting value in the peripheral device setting storage unit 117.

FIG. 5 illustrates an example of information stored in the peripheral device setting storage unit 117. The peripheral device setting storage unit 117 stores HW included in the peripheral device, the indication as to whether setting is enabled for each type of available ringing, the range of the setting value, and the setting value. For example, with respect to a peripheral device 1 including a display, a vibration, a speaker, and an LED, the indication as to whether or not setting is enabled, the range of the setting value, and the setting value associated with a notification sound, vibration, an LED color, and a blinking pattern are stored. With respect to a peripheral device 2 not including a display and a speaker, the setting associated with the notification sound is not stored (the indication as to whether or not setting is enabled is "Not Enabled"). With respect to a peripheral device 3 not including a display, a speaker, and a vibration, the setting associated with the notification sound and the vibration is not stored.

In addition, the setting value in the peripheral device setting storage unit 117 may be changed via the input unit 103. For example, the setting value may be changed within the range of the setting value, or OFF (not ringing) may be set.

Next, the control unit 107 of the peripheral device cooperative application 100 stores the setting as to whether to provide a notification from the service application to the peripheral device (notification ON/OFF) and the setting value for the notification for each peripheral device (S107). The setting value in the peripheral device setting storage unit 117 is used as an initial value of the setting value in the service application setting storage unit 119 (common setting).

The notification ON/OFF and the setting value in the service application setting storage unit 119 may be changed via the input unit 103. The value that can be input as a setting value via the input unit 103 is one of a value within the range of the setting value stored in the peripheral device setting storage unit 117, OFF (not ringing), and the setting value (common setting) stored in the peripheral device setting storage unit 117.

FIG. 6 illustrates an example of information stored in the service application setting storage unit 119. The service application setting storage unit 119 stores the notification ON/OFF and the setting value of the ringing setting for each service application. If an entry for the peripheral device is added to the peripheral device setting storage unit 117, the corresponding entry for the peripheral device is also added to the service application setting storage unit 119. For the initial value of the setting value in the service application setting storage unit 119, the notification may be ON for all the service application, and all the ringing settings may be common setting. Namely, in the initial setting, the notification from the service application is provided to the peripheral device 20 according to the setting in the peripheral device setting storage unit 117. The notification ON may be changed via the input unit 103 to the notification OFF. In this case, a notification from the service application with the notification OFF is not provided to the peripheral device 20. In addition, the common setting set as the initial value may be changed via the input unit 103. For example, the setting value may be changed within the range of the setting value, or OFF (not ringing) may be set.

<Data Transmission from Service Application to Peripheral Device>

Next, an operation in the peripheral device cooperative application 100 of transmitting transmission data from the service application to the peripheral device 20 by using the service application setting storage unit 119 set as described above will be described.

Figure 7:
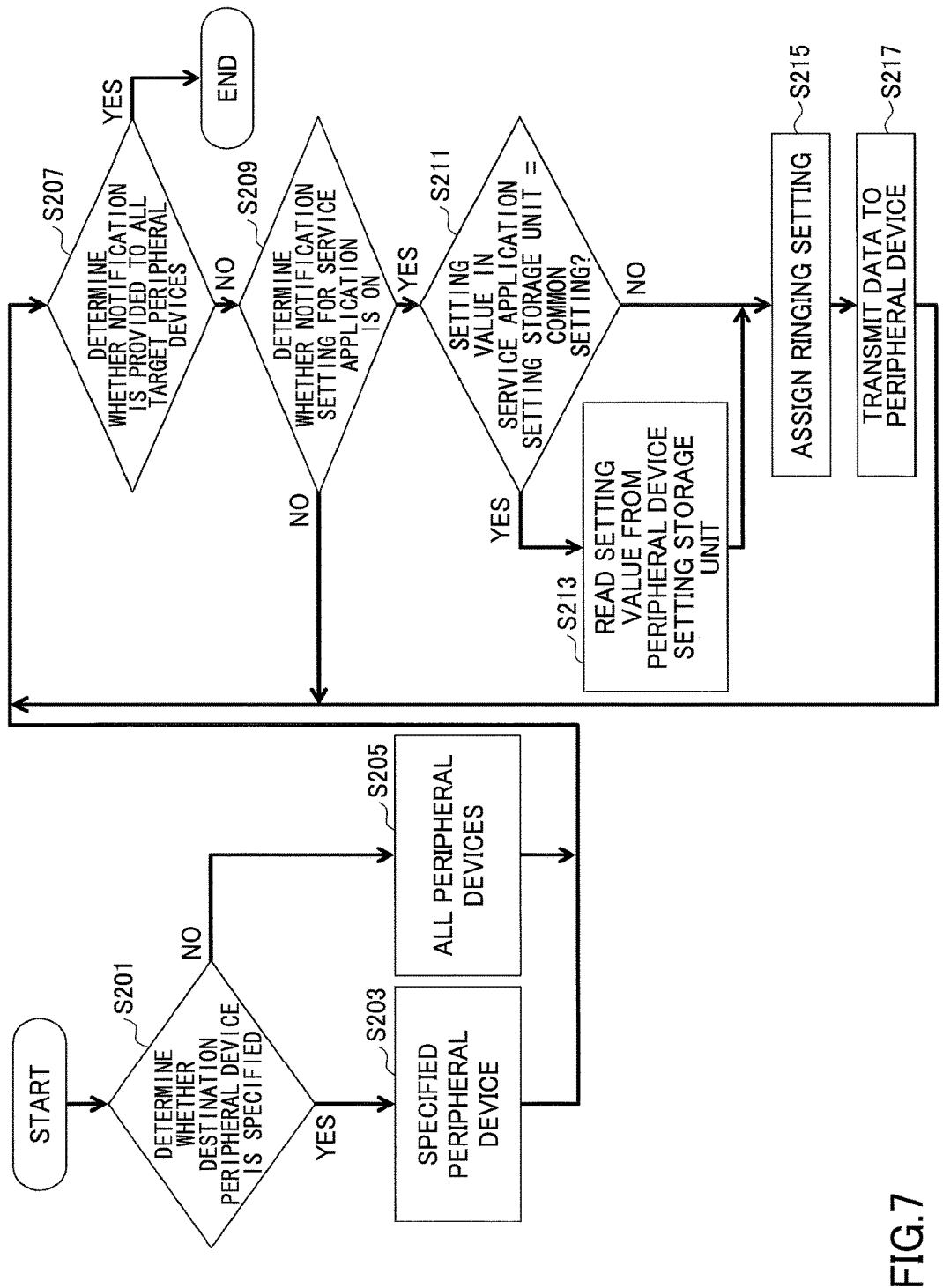
FIG. 7 is a flowchart illustrating a data transmission procedure in a peripheral device cooperative application according to an embodiment of the present invention.

FIG. 7 is a flowchart illustrating a data transmission procedure in the peripheral device cooperative application 100 according to the embodiment of the present invention.

First, when data to be transmitted from the service application to the peripheral device 20 are received, the control unit 107 in the peripheral device cooperative application 100 checks whether a destination peripheral device is specified in the data (S201).

FIG. 8A illustrates an example of data that the peripheral device cooperative application 100 receives from a service application. The data received from the service application include an identifier of the service application and an identifier of the destination peripheral device in addition to the content of transmission data to be transmitted to the peripheral device. In addition, the data may include information of no ringing setting indicating that there is no ringing setting specified by the service application.

When the data received from the service application include the identifier of the destination peripheral device, the control unit 107 determines to provide a notification to the peripheral device specified by the identifier (S203). When the data do not include the identifier of the destination peripheral device, the control unit determines to provide a notification to all the peripheral devices (S205).

Next, the control unit 107 selects one peripheral device among the target peripheral devices (S207). By referring to the service application setting storage unit 119, the control unit 107 checks whether the notification from the service application from which the data are received to the selected peripheral device is ON (S209). In addition, the service application from which the data are received can be determined on the basis of the identifier of the service application. When the notification is OFF, a next peripheral device is selected without providing a notification to the selected peripheral device (S207).

When the notification is ON, the control unit 107 checks whether the setting value in the service application setting storage unit 119 is common setting (S211). When the setting value is the common setting, the control unit 107 reads the setting value from the peripheral device setting storage unit 117 (S213) and assigns the ringing setting to the data (S215). When the setting value is not the common setting, the control unit 107 assigns the setting value of the ringing setting in the service application setting storage unit 119 to the data (S215). Then, the data are transmitted from the data transmission unit 111 to the peripheral device 20 (S217). The peripheral device 20 receives the data and performs ringing by the output unit 201 according to the ringing setting. The above-described processing is performed on all the destination peripheral devices (S207).

FIG. 8B illustrates examples of data (examples of data for respective destination peripheral devices) that the peripheral device cooperative application 100 transmits to the peripheral devices 20. The data to be transmitted to each peripheral device 20 include, in addition to the content of the transmission data to be transmitted to the peripheral device, an identifier of the service application and ringing setting. As described above, the ringing setting transmitted to the peripheral device 20 is the setting value in the peripheral device setting storage unit 117 when the setting value in the service application setting storage unit 119 is the common setting, and the ringing setting is the setting value in the service application setting storage unit 119 when the setting value in the service application setting storage unit 119 is not the common setting.

Modified Example 1 where Ring Setting Added by Service Application is Prioritized Next, a Modified Example 1 will be described where a service application specifies ringing setting when the service application transmits data to a peripheral device.

Figure 9:
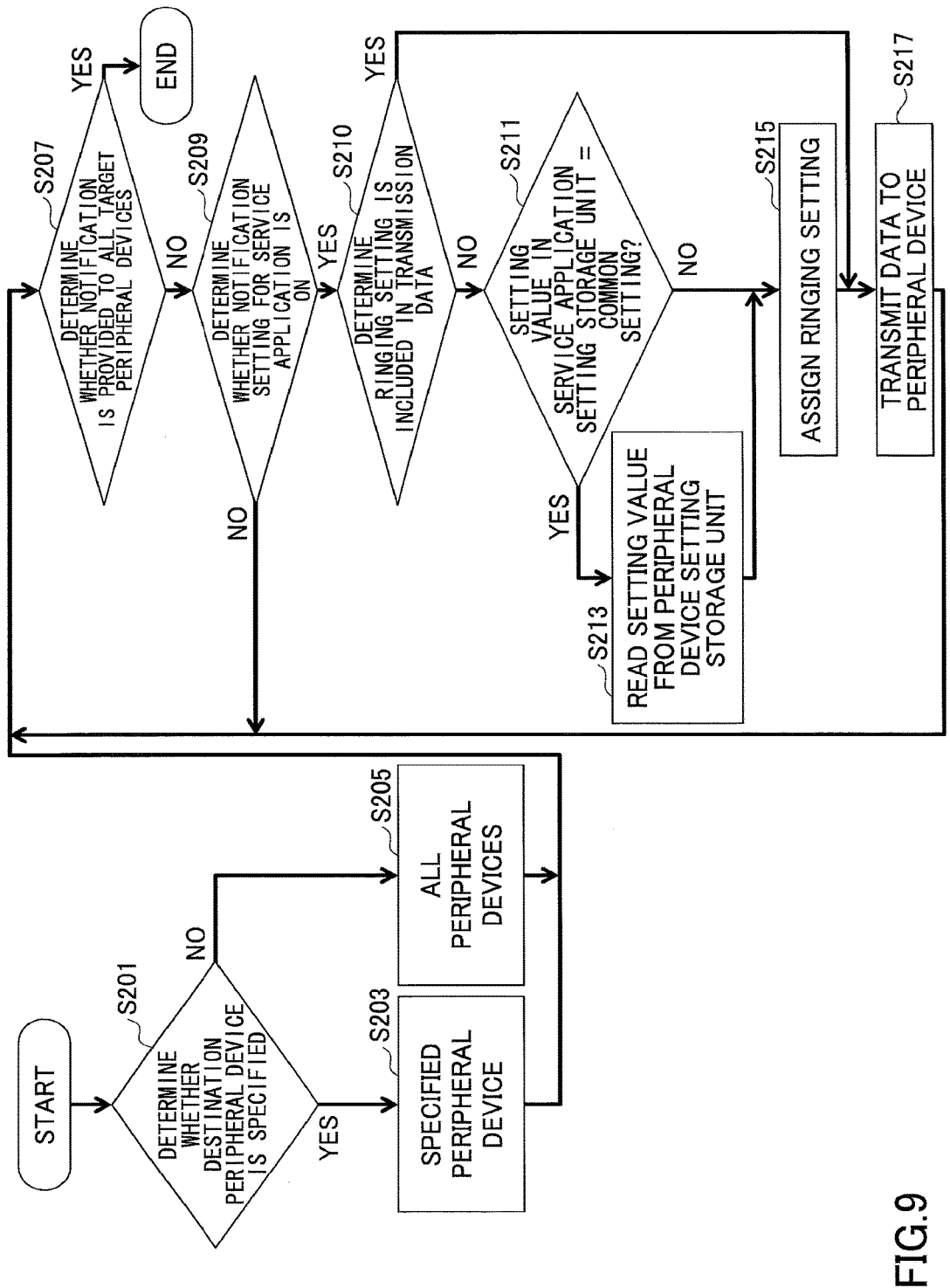
FIG. 9 is a flowchart illustrating a data transmission procedure in a peripheral device cooperative application according to a Modified Example 1 of the present invention.

FIG. 9 is a flowchart illustrating a data transmission procedure in the peripheral device cooperative application 100 according to the Modified Example 1 of the present invention.

In the Modified Example 1, the service application assigns ringing setting to data to be transmitted to the peripheral device 20 and transmits the data to the peripheral device cooperative application 100.

FIG. 10A illustrates an example of the data that the peripheral device cooperative application 100 receives from the service application. In the modified example of the present invention, the data received from the service application include, in addition to the content of the transmission data to be transmitted to the peripheral device, an identifier of the service application, an identifier of a destination peripheral device, and ringing setting. In addition, the data may include information indicating the presence of the ringing setting specified by the service application.

The processing in the peripheral device cooperative application is the same as that of FIG. 7 except for step S210. Hereinafter, the difference from FIG. 7 will be described.

By referring to the service application setting storage unit 119, the control unit 107 checks whether the notification from the service application from which the data are received to the selected peripheral device is ON (S209). When the notification is ON, the control unit 107 checks whether the ringing setting is assigned to the data transmitted from the service application (S210). When the ringing setting is not assigned, the data are transmitted from the data transmission unit 111 to the peripheral device 20 according to the same procedure as that of FIG. 7. When the ringing setting is assigned, the control unit 107 prioritizes the ringing setting for the service application. In other words, the control unit 107 transmits the data with the ringing setting for the service application from the data transmission unit 111 to the peripheral device 20 (S217). The peripheral device 20 receives the data and performing ringing by the output unit 201 according to the ringing setting. In this manner, the ringing setting assigned by the service application can be prioritized over the setting value in the setting DB 115.

FIG. 10B illustrates examples of data (examples of data for respective destination peripheral device) that the peripheral device cooperative application 100 transmits to the peripheral device 20. The data to be transmitted to each peripheral device 20 include, in addition to the content of the transmission data to be transmitted to the peripheral device, an identifier of the service application and ringing setting. As described above, when the service application specifies the ringing setting, the ringing setting to be transmitted to the peripheral device 20 is the setting value of the ringing setting specified by the service application.

Modified Example 2 where Notification to Operating System is Transmitted to Peripheral Device Next, a Modified Example 2 where not only data from a service application but also a notification from the service application to an operating system (OS) is transmitted to a peripheral device 20 will be described. For example, when the service application is a mail application, if a new mail is received, the service application provides, to the OS, a message indicating that the new mail is received and a title of the new mail, and the like. The peripheral device cooperative application 100 may transmit the notification from the service application to the OS to the peripheral device 20. However, when the peripheral device cooperative application 100 transmits data from the service application to the peripheral device 20, double notification is prevented.

Specifically, when the notification from the service application to the OS is received, the control unit 107 in the peripheral device cooperative application 100 adds an entry for the service application to the service application setting storage unit 119. An initial value of the setting value associated with the service application added to the service application setting storage unit 119 is notification OFF, and the ringing setting may be the common setting. The setting value in the service application setting storage unit 119 may be changed via the input unit 103. When the notification from the service application to the OS is received, the control unit 107 assigns ringing setting to the notification to the OS on the basis of the setting value in the service application setting storage unit 119. However, when the entry for the service application exists in the service application setting storage unit 119 and the setting value of notification ON/OFF is ON, it can be understood that the data from the service application are transmitted to the peripheral device 20. In this case, in order to prevent double notification, the control unit 107 discards the notification from the service application to the OS without transmitting the notification to the peripheral device 20.

Figure 11:
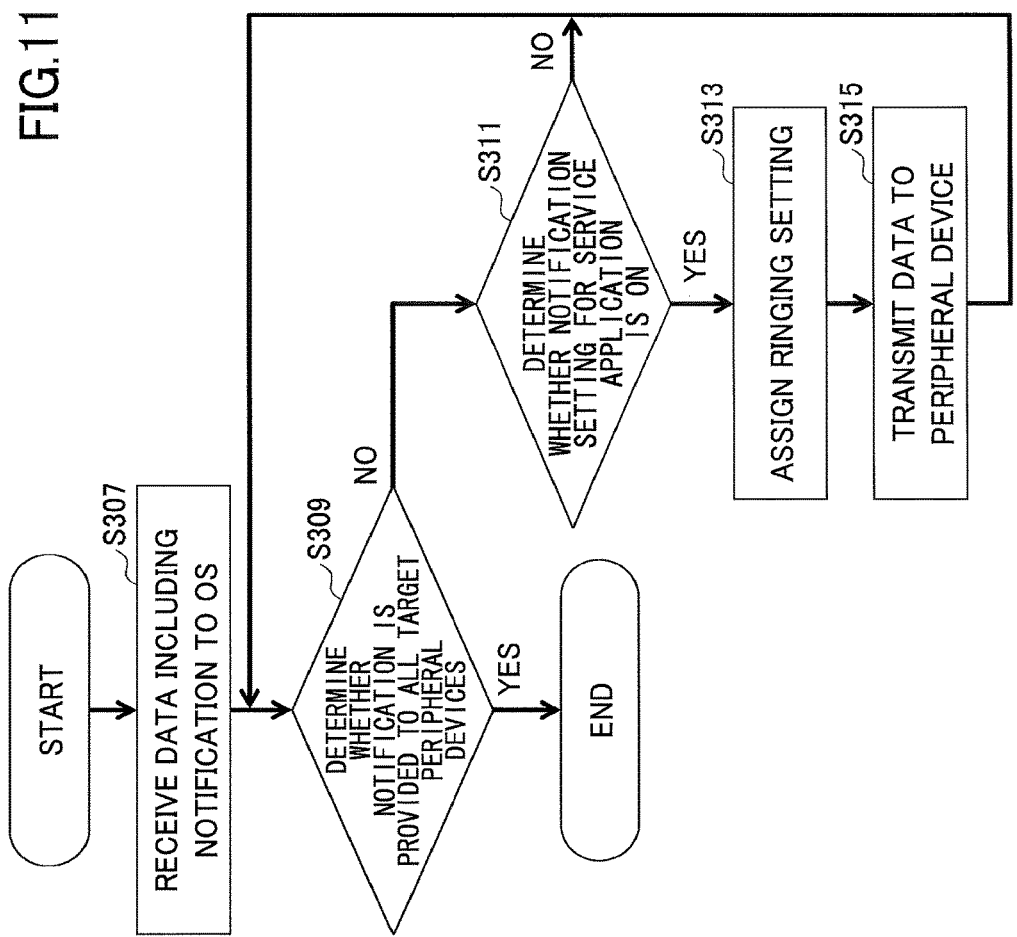
FIG. 11 is a flowchart illustrating a data transmission procedure in a peripheral device cooperative application 100 according to a Modified Example 2 of the present invention.

FIG. 11 is a flowchart illustrating a data transmission procedure in the peripheral device cooperative application 100 according to the Modified Example 2 of the present invention.

First, when the notification from the service application to the OS is received (S301), the control unit 107 in the peripheral device cooperative application 100 adds an entry for the service application transmitting the notification to the OS to the service application setting storage unit 119 (S303). However, if the entry for the service application exists in the service application setting storage unit 119 and the setting value of notification ON/OFF is ON, it can be understood that the data from the service application are transmitted to the peripheral device 20. In this case, there is no need to add an entry for the service application transmitting the notification to the OS to the service application setting storage unit 119. The initial value of the ringing setting for the service application added to the service application setting storage unit 119 is common setting, and the initial value of notification ON/OFF is set to notification OFF. These initial values may be changed via the input unit 103 (S305).

Next, the operation in a case where the service application transmits the notification to the OS thereafter will be described. When the notification from the service application to the OS is received, the control unit 107 in the peripheral device cooperative application 100 checks whether a destination peripheral device is specified in the data (S307). As described with reference to FIG. 8A, when an identifier of the destination peripheral device is included in the notification from the service application to the OS, the control unit 107 determines that the notification is provided to the peripheral device specified by the identifier, and when an identifier of the destination peripheral device is not included, the control unit determines that the notification is provided to all the peripheral devices.

Next, the control unit 107 selects one peripheral device among the target peripheral devices (S309). By referring to the service application setting storage unit 119, the control unit 107 checks whether the notification from service application from which the notification to the OS is transmitted to the selected peripheral device is ON (S311). In addition, the service application from which the notification to the OS is transmitted can be determined on the basis of the identifier of the service application included in the notification to the OS. When the notification to the selected peripheral device is OFF, the control unit 107 selects a next peripheral device without providing a notification to the selected peripheral device (S309).

When the notification to the selected peripheral device is ON and the setting values in the service application setting storage unit 119 is the common setting, the control unit 107 reads the setting value from the peripheral device setting storage unit 117 and assigns the ringing setting to the data. When the setting value is not the common setting, the control unit 107 assigns the setting value of the ringing setting in the service application setting storage unit 119 to the data (S313). Then, the data transmission unit 111 transmits the data to the peripheral device 20 (S315). The peripheral device 20 receives the data and performs ringing by the output unit 201 according to the ringing setting. The above-described processing is performed on all the destination peripheral devices (S309).

Modified Example 3 where Transmission Data are Selected According to Hardware Included in Peripheral Device Next, a Modified Example 3 where transmission data are selected according to hardware included in a peripheral device will be described. For example, when the peripheral device 20 has a display, whole of transmission data of a mail application may be transmitted to the peripheral device 20. However, when the peripheral device 20 has only a vibration, there is no need to transmit the title, body, and the like of the mail application to the peripheral device 20. In this manner, by selecting the transmission data to be transmitted to the peripheral device 20 depending on the hardware included in the peripheral device, it is possible to reduce unnecessary data transmission.

Figure 12:
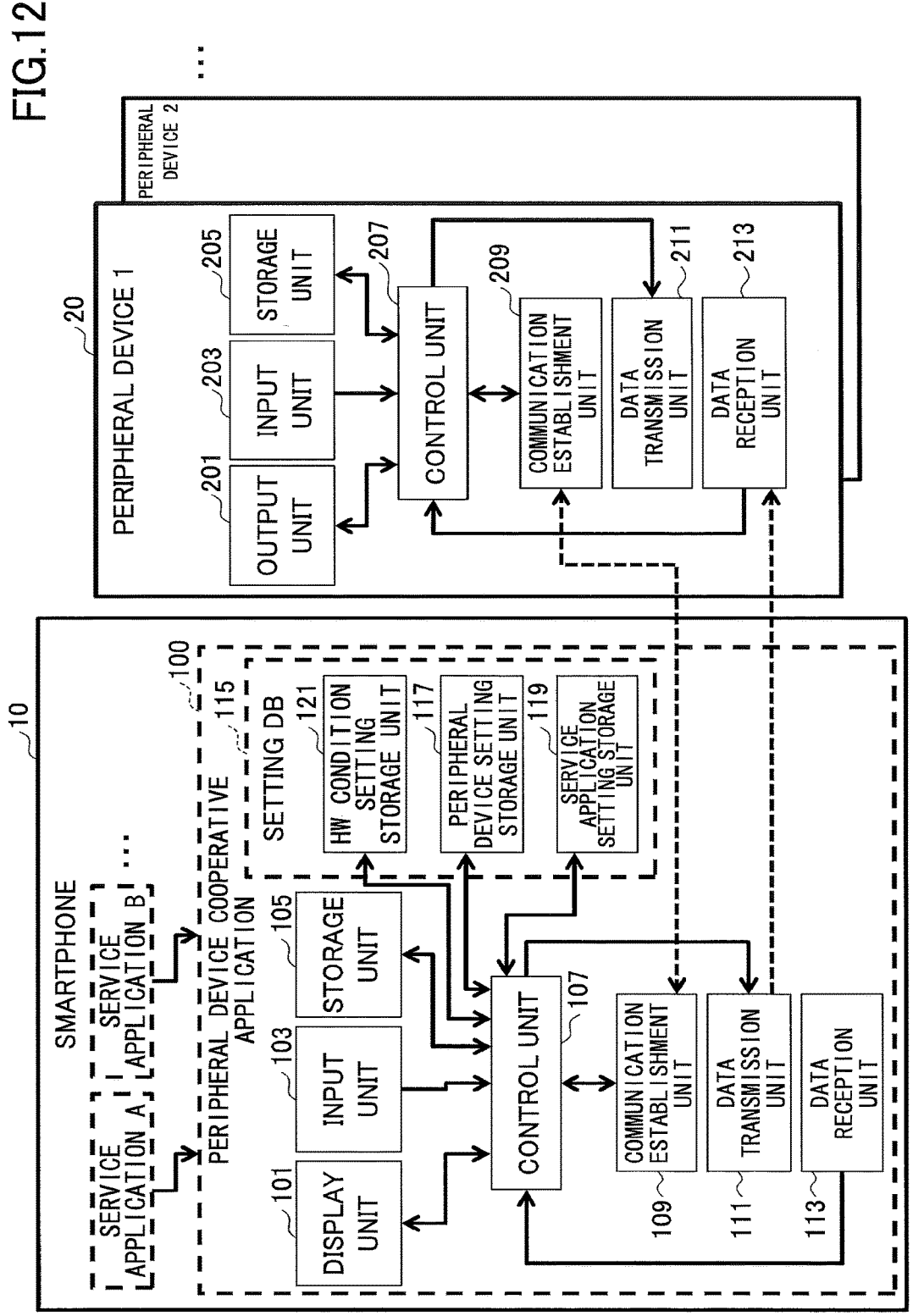
FIG. 12 is a functional block diagram of a smartphone and a peripheral device according to a third embodiment of the present invention.

FIG. 12 is a functional block diagram of the smartphone 10 and the peripheral device 20 according to the third embodiment of the present invention.

The smartphone 10 illustrated in FIG. 12 further includes an HW (hardware) condition setting storage unit 121 in addition to the smartphone 10 illustrated in FIG. 3.

The HW condition setting storage unit 121 stores the relationship between information about the hardware included in the peripheral device and transmission data to be selected from the transmission data.

FIG. 13 illustrates an example of information stored in the HW condition setting storage unit 121. The HW condition setting storage unit 121 stores a relationship between hardware included in the peripheral device and transmission data to be selected for transmission to the associated hardware from the transmission data of the service application. For example, when the peripheral device includes a display, whole of transmission data of a mail application, a schedule application, and an incoming call are transmitted to the peripheral device. For example, when the peripheral device includes a vibration, only a notification ID is selected from the transmission data of the mail application, the schedule application, and the incoming call, and the selected notification ID is transmitted to the peripheral device.

As described with reference to FIG. 5, the peripheral device setting storage unit 117 stores the information about the hardware included in the peripheral device.

Therefore, the control unit 107 acquires the information about the hardware included in the destination peripheral device for the transmission data from the peripheral device setting storage unit 117, and the control unit 107 selects transmission data, namely, deletes a portion of the transmission data by referring to the HW condition setting storage unit 121 according to the acquired information about the hardware. When the peripheral device includes a plurality of hardware components, the transmission data are selected by a sum (OR) of conditions stored in the HW condition setting storage unit 121.

As described with reference to FIGS. 8B and 10B, the data transmitted to the peripheral device 20 by the peripheral device cooperative application 100 includes the setting value of the ringing setting. However, the setting value of the ringing setting may also be selected. For example, when the peripheral device does not include a vibration, the control unit 107 may delete the ringing setting of the vibration from the data to be transmitted to the peripheral device 20. When the peripheral device does not include an LED, the control unit 107 may delete the ringing setting of the LED from the data to be transmitted to the peripheral device 20.

FIG. 14A illustrates an example of data that the peripheral device cooperative application 100 receives from the service application. As described with reference to FIG. 8A, the data received from the service application includes, in addition to the content of the transmission data to be transmitted to the peripheral device, an identifier of the service application and an identifier of the destination peripheral device. In addition, the data may include information of no ringing setting indicating that there is no ringing setting specified by the service application.

Figure 14B:
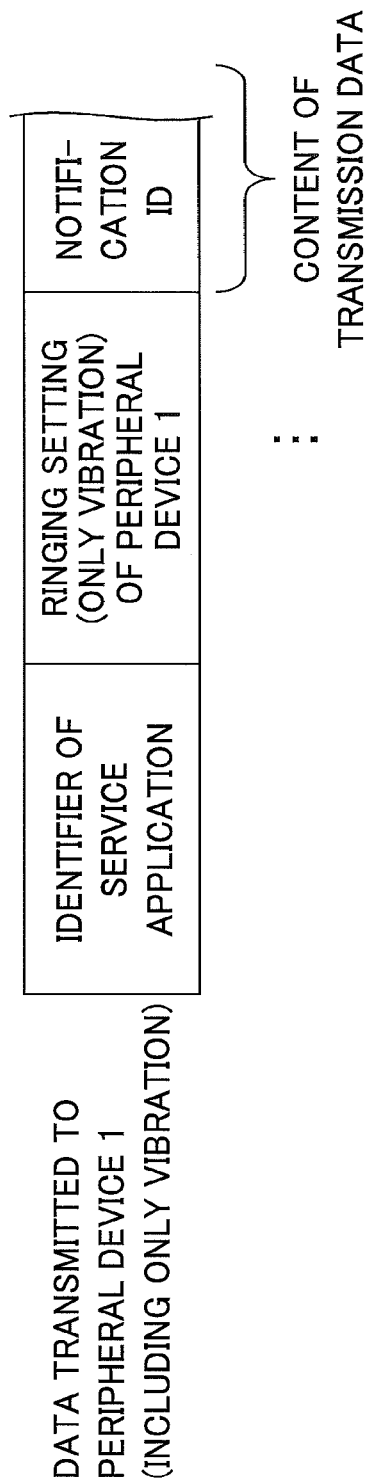
FIG. 14B is a diagram illustrating an example of data that a peripheral device cooperative application transmits to a peripheral device.

FIG. 14B illustrates an example of data that the peripheral device cooperative application 100 transmits to the peripheral device 20. The data to be transmitted to the peripheral device 20 includes, in addition to the content of the transmission data to be transmitted to the peripheral device, an identifier of the service application and ringing setting. The content of transmission data is selected according to the hardware included in the peripheral device, and the ringing setting is also selected according to the hardware included in the peripheral device. For example, when data are transmitted to a peripheral device including only a vibration, only the setting value of the ringing setting associated with the vibration is selected from the setting values of the ringing setting, and only the notification ID is selected from the content of transmission data.

The selection of the transmission data and the ringing setting may be performed, for example, between step S215 (assignment of the ringing setting) and step S217 (data transmission to the peripheral device) in the flowchart illustrated in FIG. 7.

<Data Transmission from Peripheral Device to Service Application>

Next, an operation of receiving data from the peripheral device 20 in the peripheral device cooperative application 100 and transmitting the data to the service application will be described.

Figure 15:
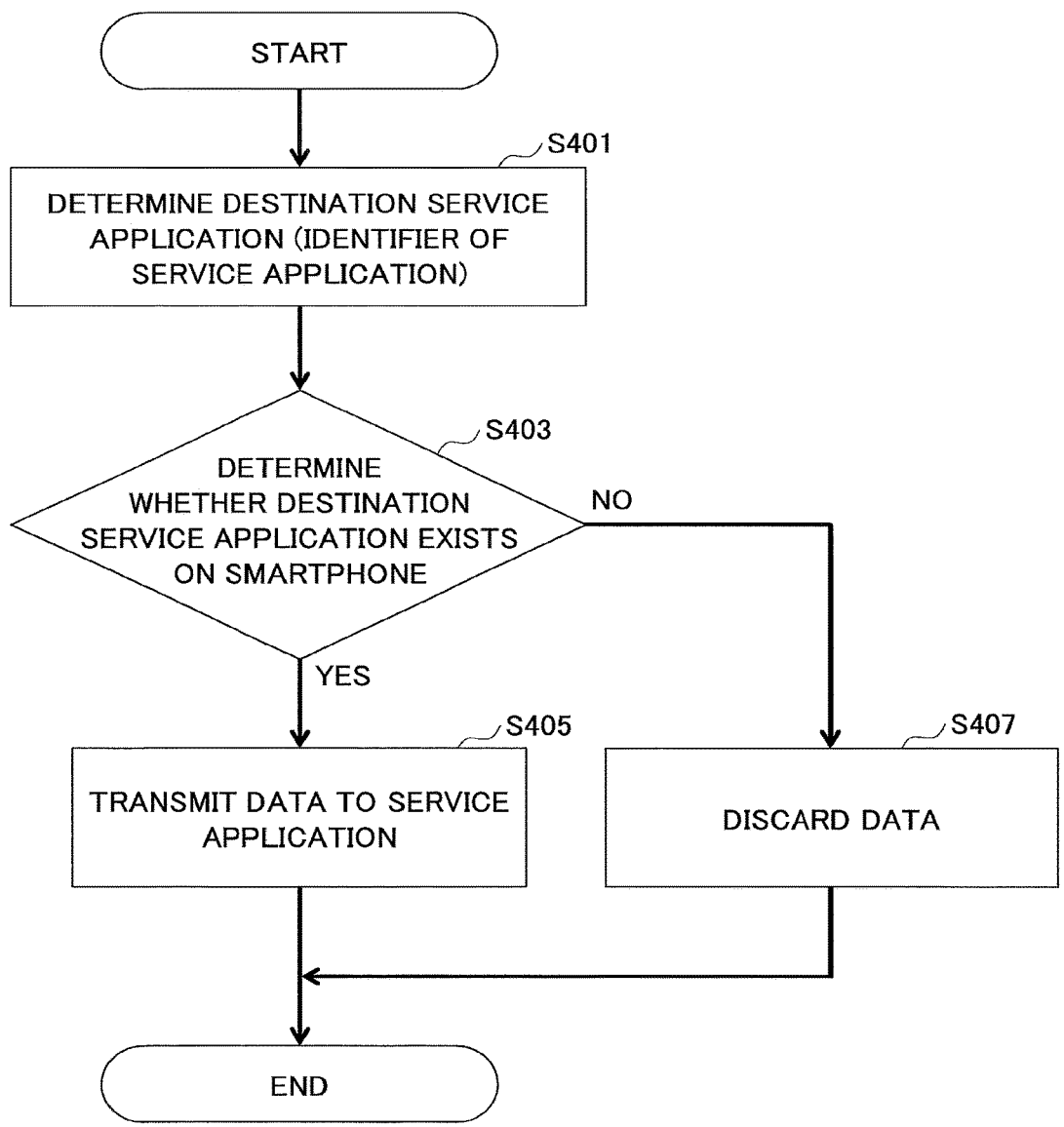
FIG. 15 is a flowchart illustrating a data reception procedure in a peripheral device cooperative application according to an embodiment of the present invention.

FIG. 15 is a flowchart illustrating a data reception procedure in the peripheral device cooperative application 100 according to the embodiment of the present invention.

First, the peripheral device 20 transmits the data acquired from the input unit 203 or the storage unit 205 from the data transmission unit 211 to the smartphone 10 together with the information about a destination service application. When data from the peripheral device 20 are received in the data reception unit 113, the control unit 107 in the peripheral device cooperative application 100 determines a destination service application on the basis of the identifier of the service application assigned to the data (S401).

Figure 16A:
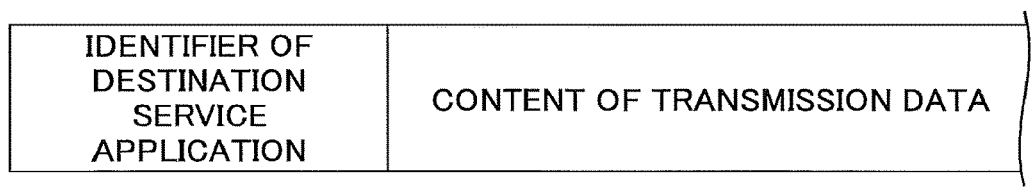
FIG. 16A is a diagram illustrating an example of data that a peripheral device cooperative application receives from a peripheral device.

FIG. 16A illustrates an example of data that the peripheral device cooperative application 100 receives from the peripheral device 20. The data received from the peripheral device includes an identifier of the service application in addition to the content of transmission data.

The control unit 107 determines whether a destination service application exists on the smartphone 10 (S403). When the service application exists, the control unit 107 transmits the data to the service application (S405). When the destination service application does not exist, the control unit 107 discards the data (S407). The service application receives the data from the peripheral device cooperative application 100 and performs operations such as displaying data.

Figure 16B:
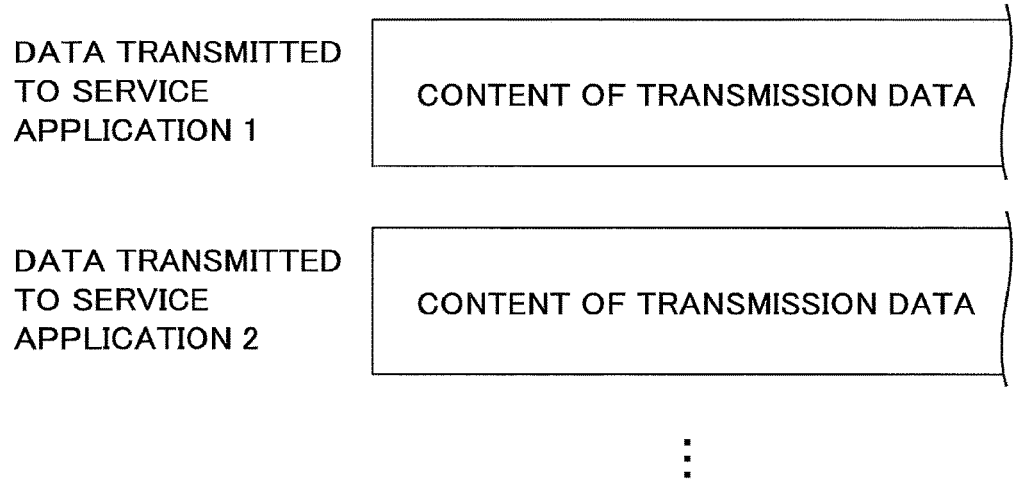
FIG. 16B is a diagram illustrating an example of data that a peripheral device cooperative application transmits to a service application.

FIG. 16B illustrates an example of data that the peripheral device cooperative application 100 transmits to the service application. The data transmitted to the service application may include the content of the data received from the peripheral device.

<Data Transfer from Peripheral Device to Peripheral Device>

Next, an operation of receiving data from the peripheral device 20_1 in the peripheral device cooperative application 100 and transferring data to another peripheral device 20_2 will be described.

Figure 17:
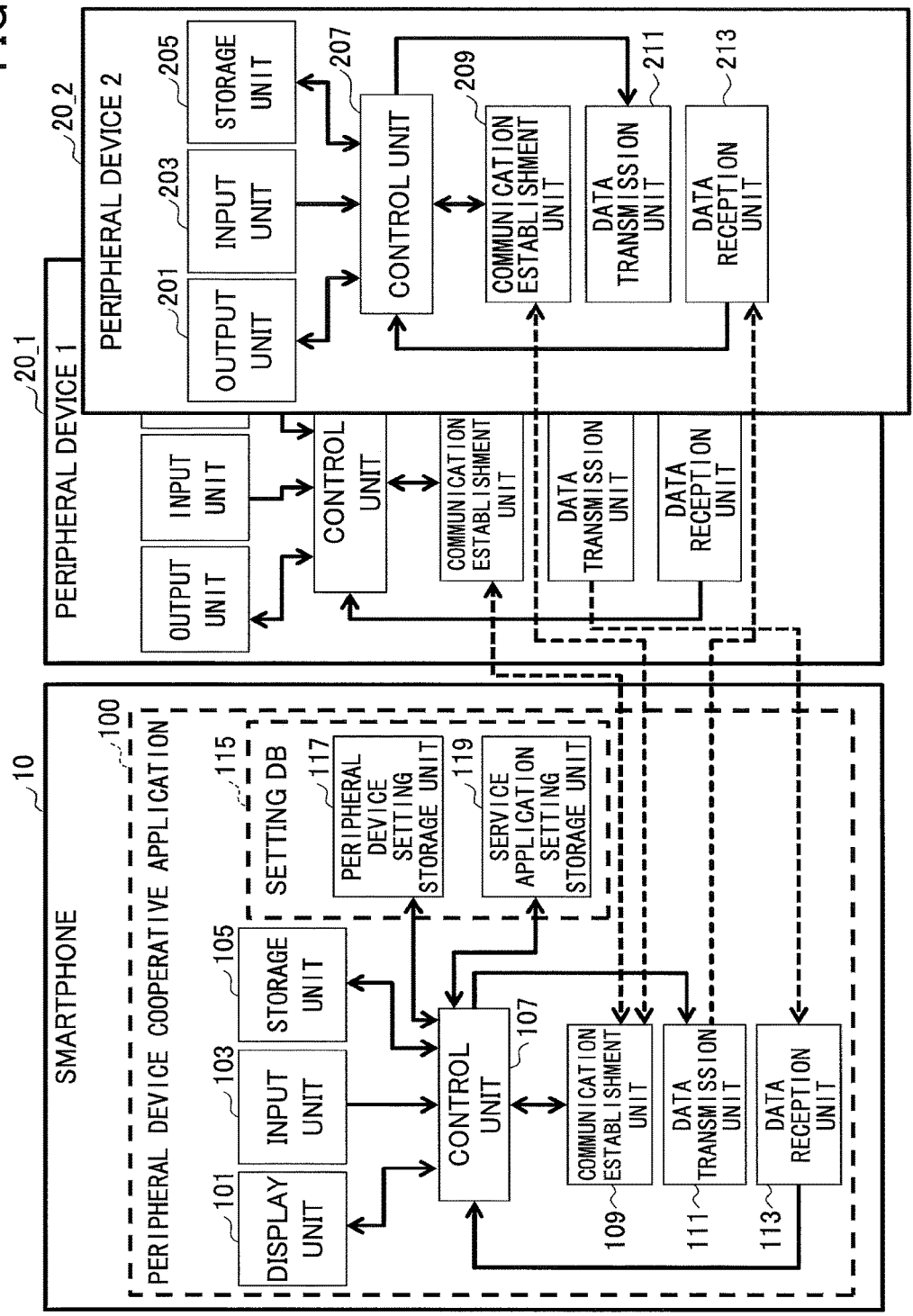
FIG. 17 is a functional block diagram of a smartphone and peripheral devices according to an embodiment of the present invention.

FIG. 17 is a functional block diagram of the smartphone 10 and the peripheral devices 20_1 and 202 according to the embodiment of the present invention. The smartphone 10 and the peripheral devices 20_1 and 202 illustrated in FIG. 17 are configured similarly to FIG. 3. In FIG. 17, in order to clarify the flow of data to and from the peripheral devices, a flow of signals is added.

Figure 18:
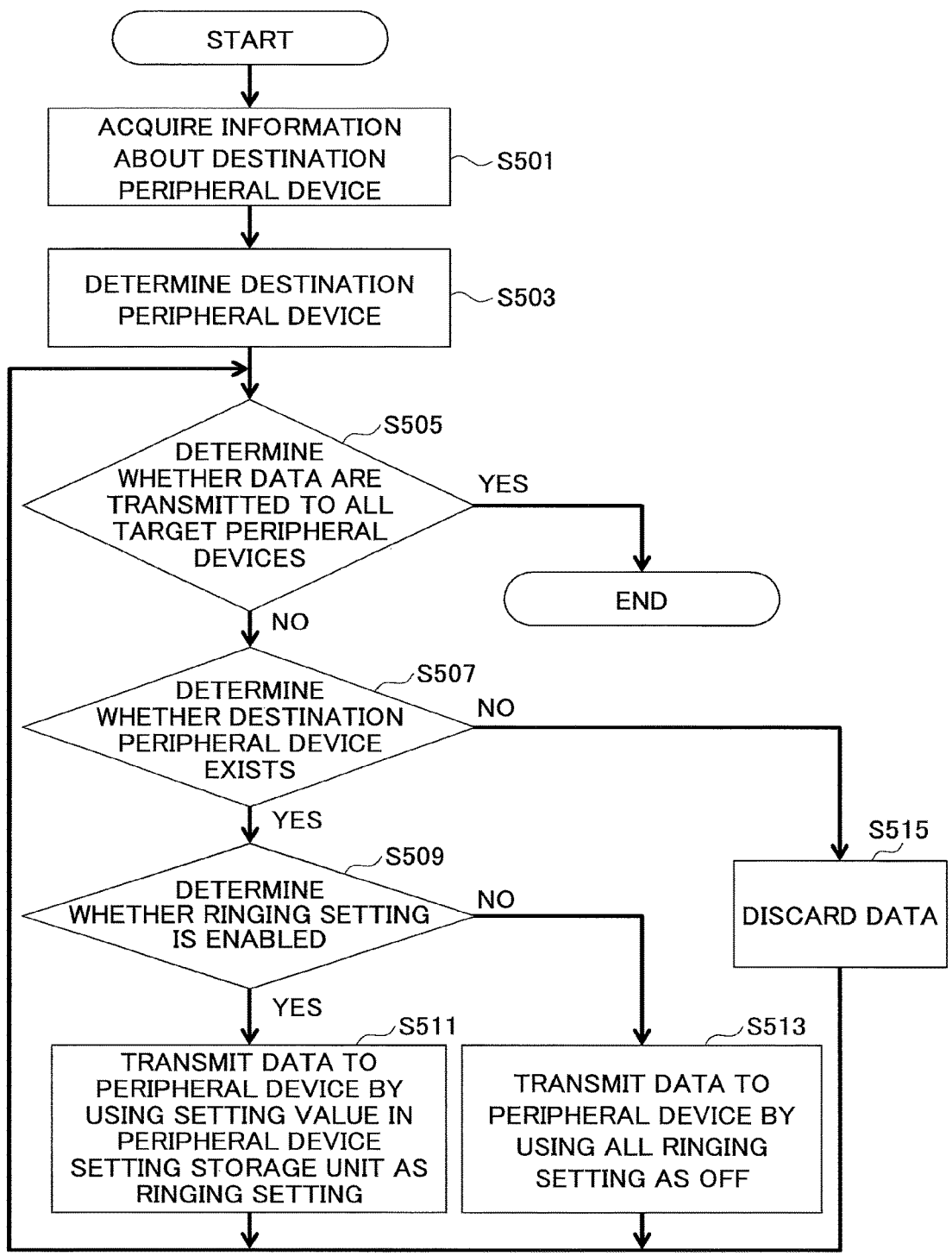
FIG. 18 is a flowchart illustrating a data transfer procedure in a peripheral device cooperative application according to an embodiment of the present invention.

FIG. 18 is a flowchart illustrating a data transfer procedure in the peripheral device cooperative application 100 according to the embodiment of the present invention.

First, the peripheral device 20_1 transmits the data acquired from the input unit 203 or the storage unit 205 from the data transmission unit 211 to the smartphone 10 together with the information about the destination peripheral device. The peripheral device 20_1 may transmit the presence of ringing setting or no ringing setting in addition to the information about the destination peripheral device. The information about the destination peripheral device may be a peripheral device name or an identifier specifying the destination peripheral device, may be a type of the peripheral device, or may be information about hardware included in in the peripheral device (for example, a peripheral device including a display or a peripheral device including a vibration, or the like). When the control unit 107 in the peripheral device cooperative application 100 receives the data to which the information about the destination peripheral device is assigned from the peripheral device 20_1 (S501) in the data reception unit 113, the control unit 107 in the peripheral device cooperative application 100 determines the destination peripheral device (S503). For example, when the information about the hardware included in the peripheral device is acquired as the information about the destination peripheral device, the control unit 107 selects the peripheral device that satisfies the condition of the hardware by referring to the peripheral device setting storage unit 117.

FIG. 19A illustrates an example of data that the peripheral device cooperative application 100 receives from the peripheral device 20_1. The data received from the peripheral device includes, in addition to the content of transmission data, information about the destination peripheral device and the presence of ringing setting or no ringing setting.

Next, the control unit 107 selects one peripheral device among the destination peripheral devices (S505, S507), and when the information indicating the presence of ringing setting is assigned to the data (S509), the control unit 107 reads the setting value from the peripheral device setting storage unit 117 and assigns the data to the ringing setting (S511). When information indicating no ringing setting is assigned to the data (S513), the information indicating no ringing setting is assigned to the data (S513). When information indicating the presence of ringing setting or no ringing setting is not assigned, the control unit 107 may determine the presence of ringing setting or may determine no ringing setting. Then, the data transmission unit 111 transmits data to the peripheral device 20_2. However, when there is no peripheral device matching the information about the destination peripheral device, the control unit 107 discards the data (S515). The peripheral device 202 receives the data and performs ringing by the output unit 201 according to the ringing setting. The above-described processing is performed on all the destination peripheral devices (S505).

FIG. 19B illustrates an example of data that the peripheral device cooperative application 100 transmits to the peripheral device 202. The data to be transmitted to the peripheral device 202 includes the ringing setting in addition to the content of the transmission data to be transmitted to the peripheral device. As described above, when the peripheral device 20_1 assigns the information indicating the presence of ringing setting, the ringing setting transmitted to the peripheral device 20 is the setting value in the peripheral device setting storage unit 117.

Data transmission from the peripheral device to the service application and data transfer from one peripheral device to another peripheral device can be combined by using information indicating the type of destination.

FIG. 20 is a flowchart that combines the flowchart of FIG. 15 and the flowchart of FIG. 18.

When data from the peripheral device are received in the data reception unit 113, the control unit 107 in the peripheral device cooperative application 100 determines whether the destination is a service application or a peripheral device on the basis of the information about the type of destination assigned to the data (S601).

FIGS. 21A and 21B illustrate examples of data that the peripheral device cooperative application 100 receives from peripheral device. FIG. 21A illustrates the case where the destination is a service application, and FIG. 21B illustrates the case where the destination is a peripheral device. As illustrated in FIGS. 21A and 21B, the data that the peripheral device cooperative application 100 receives from the peripheral device includes the information indicating the type of the destination. When the destination is a service application, an identifier of the destination service application is included, and when the destination is a peripheral device, information about the destination peripheral device and the presence of ringing setting or no ringing setting are included.

When the destination is a service application, the data from the peripheral device are transmitted to the service application according to the flowchart of FIG. 15 (S603). On the other hand, when the destination is a peripheral device, the data from the peripheral device are transferred to the peripheral device according to the flowchart of FIG. 18 (S605).

In the above-described embodiment, the information indicating the type of the destination is used. However, a range of the value used for the identifier of the destination service application and a range of the value used for the information about the destination peripheral device may be divided in advance, so that it is possible not to use the information indicating the type of the destination.

Modified Example 4 where Setting DB is Changed by Peripheral Device

Next, a Modified Example 4 where a setting DB 115 is changed by a peripheral device 20 will be described. In the above-described embodiment, the setting DB 115 in the smartphone is changed via the input unit 103 of the smartphone 10. However, in the Modified Example 4, a case where the setting DB 115 is changed by the peripheral device 20 will be described.

FIG. 22 is a functional block diagram of the smartphone 10 and the peripheral device 20 according to the Modified Example 4 of the present invention.

The peripheral device 20 illustrated in FIG. 22 further includes the setting DB 215 in addition to the peripheral device 20 illustrated in FIG. 3.

The setting DB 215 stores information of the setting DB 115 received from the peripheral device cooperative application 100. The information of the setting DB 215 may be changed via the input unit 203.

Figure 23:
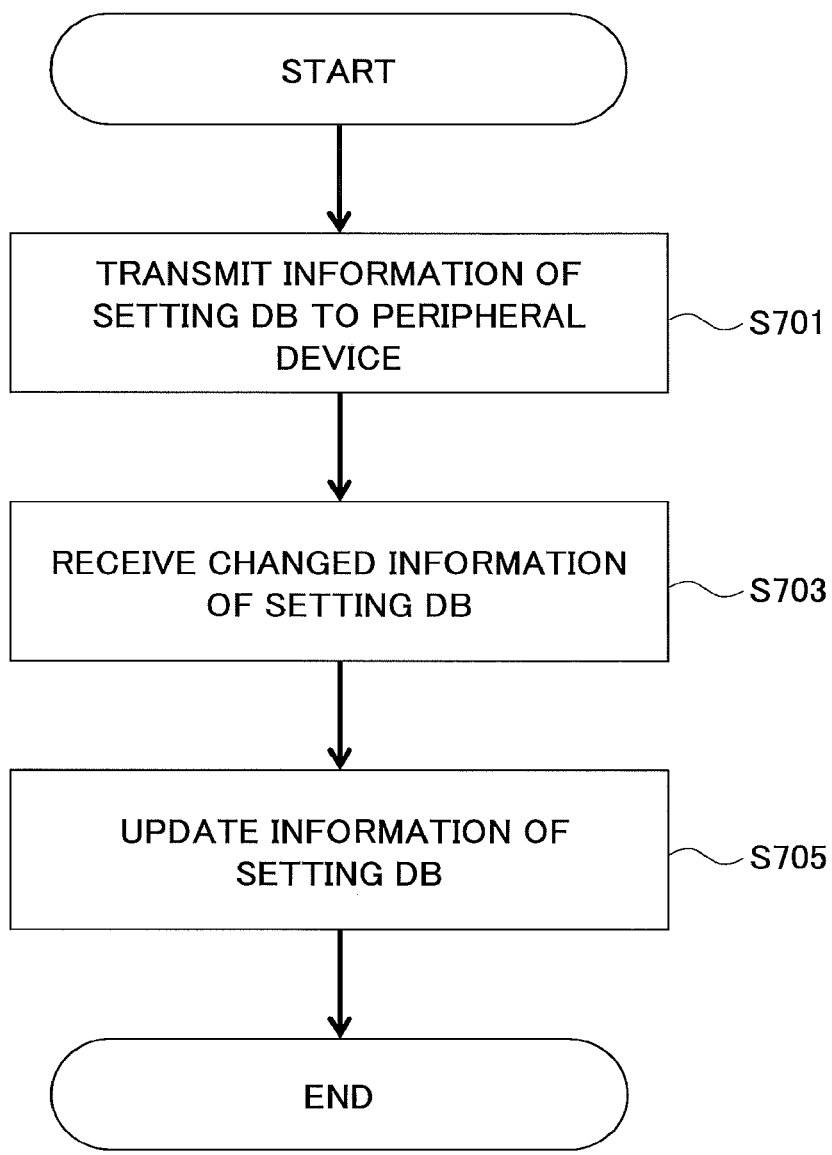
FIG. 23 is a flowchart illustrating a setting DB changing procedure in a peripheral device cooperative application according to a Modified Example 4 of the present invention.

FIG. 23 is a flowchart illustrating a setting DB changing procedure in the peripheral device cooperative application according to the Modified Example 4 of the present invention.

The data transmission unit 111 in the peripheral device cooperative application 100 transmits the information of the setting DB 115 to the peripheral device (S701). The information of the setting DB 115 to be transmitted may be whole or part of the information of the peripheral device setting storage unit 117, the service application setting storage unit 119, and the HW condition setting storage unit 121. For example, only information associated with the destination peripheral device 20 may be transmitted.

When the data reception unit 213 in the peripheral device 20 receives the information of the setting DB 115, the control unit 207 stores the received information in the setting DB 215. The information in the setting DB 215 can be changed via the input unit 203. The changed information of the setting DB 215 is transmitted from the data transmission unit 211 to the smartphone 10.

The data reception unit 113 in the peripheral device cooperative application 100 receives the changed information of the setting DB 215 (S703). The control unit 107 updates the information of the setting DB 115 according to the received information of the setting DB 215 (S705). Then, data are transmitted and received between the service application and the peripheral device 20 according to the updated information of the setting DB 115.

Modified Example 5 where Setting DB or the Like is Changed Via Server

In the Modified Example 4, the example of updating the information of the setting DB 115 by using the peripheral device 20 is described. Similarly, the peripheral device cooperative application 100 can also update the information of the setting DB 115 by using a server.

FIG. 24 is a functional block diagram of a smartphone 10, a peripheral device 20, and a server 30 according to a Modified Example 5 of the present invention.

The smartphone 10 and the peripheral device 20 illustrated in FIG. 24 are configured similarly to FIG. 3. However, the communication establishment unit 109, the data transmission unit 111, and the data reception unit 113 in the smartphone 10 can be connected to the server 30.

The data transmission unit 111 in the peripheral device cooperative application 100 may transmit the information of the setting DB 115 to the server 30. The information of the setting DB 115 to be transmitted may be whole or part of the information of the peripheral device setting storage unit 117, the service application setting storage unit 119, and the HW condition setting storage unit 121.

The data reception unit 113 in the peripheral device cooperative application 100 receives the changed information of the setting DB 115, and the control unit 107 updates the information of the setting DB 115 according to the received information of the setting DB 115. Then, data are transmitted and received between the service application and the peripheral device according to the updated information of the setting DB 115.

According to the same procedure, the peripheral device cooperative application 100 can also add or change a file or a program describing the operation of the control unit 107 by using the server 30. For example, a data transmission and reception profile for managing a sequence or a type of data to be transmitted may be added or changed.

Furthermore, it is also possible to transmit data for the peripheral device 20 from the server 30 to the peripheral device 20. For example, the peripheral device cooperative application 100 may receive update data for firmware in the peripheral device 20 from the server 30 and transmit the data to the peripheral device 20.

Effect of Embodiment of the Invention

As described above, according to the embodiment of the present invention, it is possible to provide a scheme in which a plurality of service applications in an information communication terminal such as a smartphone can cooperate with a plurality of peripheral devices. In other words, it is possible to unify communication schemes that are different among respective peripheral devices, and by means of the peripheral device cooperative application 100 according to the embodiment of the present invention, it is possible to cooperate with peripheral devices in a unified communication scheme. As a result, since service application developers may generate only one unified service application with a cooperation scheme, it is possible to reduce development efforts.

In addition, according to the embodiment of the present invention, it is possible to collectively manage notification setting from the service applications to the peripheral devices. Since it is unnecessary for the user to change the notification setting by activating a plurality of service applications, it is possible to reduce user's efforts. In addition, since operations are unified by the peripheral device cooperative application 100 according to the embodiment of the present invention, usability is improved.

In addition, as described in the embodiment of the present invention, it is possible to provide the common setting in the service application setting storage unit 119 in the peripheral device cooperative application 100. By using the common setting, it is possible to automatically generate the setting value when the service application provides a notification to the peripheral device, and by simply changing the setting in the peripheral device setting storage unit 117, it is possible to change all the setting values of the service applications at once.

Furthermore, by allowing the setting value to be changed for each peripheral device in the service application setting storage unit 119, it is possible to set whether to provide a notification for data from the service application to each peripheral device, or it is possible to perform different ringing setting for each peripheral device.

According to the Modified Example 1 of the present invention, it is possible for the service application to assign the ringing setting, and the ringing setting assigned by the service application can be prioritized over the setting value in the service application setting storage unit 119 and the setting value in the peripheral device setting storage unit 117.

According to the Modified Example 2 of the present invention, it is possible to transmit, to the peripheral device, not only data from the service application but also the notification from the service application to the OS. In this case, it is possible to prevent double notification, and thus it is possible to avoid unnecessary data transmission.

According to the Modified Example 3 of the present invention, since the transmission data are selected according to the hardware included in the peripheral device, unnecessary data transmission is avoided, and thus, it is possible to reduce power consumption of the peripheral device and the smartphone.

In addition, according to the embodiment of the present invention, it is possible to transmit data by specifying a service application from a peripheral device, and it is also possible to transmit data by specifying a peripheral device from another peripheral device.

According to the Modified Example 4 of the present invention, it is possible to change the ringing setting without operating the smartphone, and thus it is possible to improve user's convenience.

According to the Modified Example 5 of the present invention, it is possible to receive information (information of the setting DB, a profile of data transmission and reception, firmware of a peripheral device, or the like) managed by a server and update the information of the setting DB 115 or the peripheral device 20.

For the convenience of description, the information communication terminal according to the embodiment of the present invention is described with reference to the functional block diagrams. However, the information communication terminal according to the embodiment of the present invention may be implemented by hardware, software, or a combination thereof. For example, the embodiment of the present invention can be realized by a program for implementing each function of the information communication terminal according to the embodiment of the present invention, a program for causing a computer to execute each procedure of a method according to the embodiment of the present invention, or the like. In addition, each functional unit may be used in combination as required. In addition, the method according to the embodiment of the present invention may be performed in a sequence different from the sequence illustrated in the embodiment.

Heretofore, a solution for providing a scheme in which a plurality of service applications in an information communication terminal can cooperate with a plurality of peripheral devices and collectively managing notification setting from the service applications to peripheral devices has been described. However, the present invention is not limited to the above embodiments, and various modifications and applications are available within the scope of the claims.

This international application claims priority on the basis of Japanese Patent Application No. 2014-239340 filed on Nov. 26, 2014, the entire contents of which are incorporated by reference into this international application.

EXPLANATIONS OF LETTERS OR NUMERALS 10 smartphone
100 peripheral device cooperative application
101 display unit
103 input unit
105 storage unit
107 control unit
109 communication establishment unit
111 data transmission unit
113 data reception unit
115 setting DB
117 peripheral device setting storage unit
119 service application setting storage unit
121 HW condition setting storage unit
20 peripheral device
201 output unit
203 input unit
205 storage unit
207 control unit
209 communication establishment unit
211 data transmission unit
213 data reception unit
215 setting DB
30 server

The invention claimed is:

1. An information communication terminal comprising:
a reception unit configured to receive, from a plurality of connected peripheral devices, setting values of notification setting for the plurality of connected peripheral devices;
a peripheral device setting storage unit configured to store the received setting values of notification setting for the plurality of peripheral devices;
a service application setting storage unit configured to store setting values of notification setting from a service application to the plurality of connected peripheral devices by using the setting values stored in the peripheral device setting storage unit as initial values;
a control unit configured to assign a setting value of notification setting to transmission data on the basis of a setting value stored in the service application setting storage unit when the transmission data are received from the service application; and
a transmission unit configured to transmit the transmission data to which the setting value of notification setting is assigned to at least one peripheral device;
wherein, when a notification from the service application to an operating system is received and when the service application is not found in the service application setting storage unit, the control unit stores a setting value of the service application in the service application setting storage unit and assigns a setting value of notification setting to the notification to the operating system on the basis of the setting value stored in the service application setting storage unit, and the transmission unit transmits the transmission data to which the setting value of notification setting is assigned to the at least one peripheral device, and
wherein, when the notification from the service application to the operating system is received and when the service application is found in the service application setting storage unit and the notification setting for the service application in the service application setting storage unit is ON, the control unit discards the received notification to the operating system without transmitting to the peripheral device.

2. The information communication terminal according to claim 1, wherein, when common setting which refers to a setting value stored in the peripheral device setting storage unit is stored in the service application setting storage unit, the control unit assigns the setting value of notification setting to the transmission data by referring to the setting value stored in the peripheral device setting storage unit.

3. The information communication terminal according to claim 1, wherein the control unit checks whether a setting value of notification setting is assigned to the transmission data received from the service application, and when the setting value is assigned, the control unit prioritizes the setting value.

4. The information communication terminal according to claim 1, further comprising a hardware condition setting storage unit configured to store a relationship between information about hardware included in the peripheral devices and transmission data to be selected from transmission data,
wherein the peripheral device setting storage unit stores the information about hardware included in the peripheral devices, and
wherein the control unit acquires information about hardware included in a destination peripheral device to which the transmission data are transmitted from the peripheral device setting storage unit and selects the transmission data according to the acquired information about hardware by referring to the hardware condition setting storage unit.

5. The information communication terminal according to claim 1,
wherein the reception unit receives data to which information indicating a destination peripheral device is assigned from at least one peripheral device, and
wherein the control unit assigns a setting value of notification setting to the received data on the basis of the setting value stored in the peripheral device setting storage unit.

6. The information communication terminal according to claim 1,
wherein the transmission unit transmits, to a peripheral device, at least a portion of the setting values in the peripheral device setting storage unit and the service application setting storage unit,
wherein the reception unit receives a setting value changed in the peripheral device, and wherein the control unit updates at least the setting values in the peripheral device setting storage unit and the service application setting storage unit according to the received setting value.

7. The information communication terminal according to claim 1,
wherein the reception unit receives a setting value of notification setting for a peripheral device from a server, and
wherein the control unit updates at least the setting values in the peripheral device setting storage unit and the service application setting storage unit according to the received setting value.

8. A peripheral device cooperation method in an information communication terminal, comprising steps of:
receiving, from a plurality of connected peripheral devices, setting values of notification setting for the plurality of connected peripheral devices;
storing the received setting values of notification setting for the plurality of peripheral device in a peripheral device setting storage unit;
storing, in a service application setting storage unit, setting values of notification setting from a service application to the plurality of connected peripheral devices by using the setting values stored in the peripheral device setting storage unit as initial values;
assigning a setting value of notification setting to transmission data on the basis of a setting value stored in the service application setting storage unit when the transmission data are received from the service application; and
transmitting the transmission data to which the setting value of notification setting is assigned to at least one peripheral device;
the method further comprising the steps of:
when a notification from the service application to an operating system is received and when the service application is not found in the service application setting storage unit, storing a setting value of the service application in the service application setting storage unit and assigning a setting value of notification setting to the notification to the operating system on the basis of the setting value stored in the service application setting storage unit, and transmitting the transmission data to which the setting value of notification setting is assigned to the at least one peripheral device, and
when the notification from the service application to the operating system is received and when the service application is found in the service application setting storage unit and the notification setting for the service application in the service application setting storage unit is ON, discarding the received notification to the operating system without transmitting to the peripheral device.

9. A non-transitory computer-readable storage medium which stores a program causing a computer as an information communication terminal for cooperating with peripheral devices to function as:
a reception means for receiving, from a plurality of connected peripheral devices, setting values of notification setting for the plurality of connected peripheral devices;
a peripheral device setting storage means for storing the received setting values of notification setting for the plurality of peripheral devices;

a service application setting storage means for storing setting values of notification setting from a service application to the plurality of connected peripheral devices by using the setting values stored in the peripheral device setting storage means as initial values;
a control means for assigning a setting value of notification setting to transmission data on the basis of a setting value stored in the service application setting storage means when the transmission data are received from the service application; and
a transmission means for transmitting the transmission data to which the setting value of notification setting is assigned to at least one peripheral device;
wherein, when a notification from the service application to an operating system is received and when the service application is not found in the service application setting storage means, the control means stores a setting value of the service application in the service application setting storage means and assigns a setting value of notification setting to the notification to the operating system on the basis of the setting value stored in the service application setting storage means, and the transmission means transmits the transmission data to which the setting value of notification setting is assigned to the at least one peripheral device, and
wherein, when the notification from the service application to the operating system is received and when the service application is found in the service application setting storage means and the notification setting for the service application in the service application setting storage means is ON, the control means discards the received notification to the operating system without transmitting to the peripheral device.

10. The information communication terminal according to claim 2, wherein the control unit checks whether a setting value of notification setting is assigned to the transmission data received from the service application, and when the setting value is assigned, the control unit prioritizes the setting value.

11. The information communication terminal according to claim 2, further comprising a hardware condition setting storage unit configured to store a relationship between information about hardware included in the peripheral devices and transmission data to be selected from transmission data,
wherein the peripheral device setting storage unit stores the information about hardware included in the peripheral devices, and
wherein the control unit acquires information about hardware included in a destination peripheral device to which the transmission data are transmitted from the peripheral device setting storage unit and selects the transmission data according to the acquired information about hardware by referring to the hardware condition setting storage unit.

12. The information communication terminal according to claim 3, further comprising a hardware condition setting storage unit configured to store a relationship between information about hardware included in the peripheral devices and transmission data to be selected from transmission data,
wherein the peripheral device setting storage unit stores the information about hardware included in the peripheral devices, and
wherein the control unit acquires information about hardware included in a destination peripheral device to which the transmission data are transmitted from the peripheral device setting storage unit and selects the transmission data according to the acquired information about hardware by referring to the hardware condition setting storage unit.

13. The information communication terminal according to claim 1, further comprising a hardware condition setting storage unit configured to store a relationship between information about hardware included in the peripheral devices and transmission data to be selected from transmission data, wherein the peripheral device setting storage unit stores the information about hardware included in the peripheral devices, and wherein the control unit acquires information about hardware included in a destination peripheral device to which the transmission data are transmitted from the peripheral device setting storage unit and selects the transmission data according to the acquired information about hardware by referring to the hardware condition setting storage unit.

14. The information communication terminal according to claim 2,
wherein the reception unit receives data to which information indicating a destination peripheral device is assigned from at least one peripheral device, and
wherein the control unit assigns a setting value of notification setting to the received data on the basis of the setting value stored in the peripheral device setting storage unit.

15. The information communication terminal according to claim 3,
wherein the reception unit receives data to which information indicating a destination peripheral device is assigned from at least one peripheral device, and
wherein the control unit assigns a setting value of notification setting to the received data on the basis of the setting value stored in the peripheral device setting storage unit.

16. The information communication terminal according to claim 1, wherein the reception unit receives data to which information indicating a destination peripheral device is assigned from at least one peripheral device, and wherein the control unit assigns a setting value of notification setting to the received data on the basis of the setting value stored in the peripheral device setting storage unit.

17. The information communication terminal according to claim 4,
wherein the reception unit receives data to which information indicating a destination peripheral device is assigned from at least one peripheral device, and
wherein the control unit assigns a setting value of notification setting to the received data on the basis of the setting value stored in the peripheral device setting storage unit.

* * * * *